(12) United States Patent
Larsen

(10) Patent No.: US 12,447,604 B2
(45) Date of Patent: Oct. 21, 2025

(54) ROBOTIC ASSISTANCE DEVICE USING REDUCTION OF COGNITIVE LOAD OF A USER

(71) Applicant: Grant Kenji Larsen, Austin, TX (US)

(72) Inventor: Grant Kenji Larsen, Austin, TX (US)

(*) Notice: Subject to any disclaimer, the term of this patent is extended or adjusted under 35 U.S.C. 154(b) by 199 days.

(21) Appl. No.: 17/977,747

(22) Filed: Oct. 31, 2022

(65) Prior Publication Data

US 2023/0158662 A1  May 25, 2023

Related U.S. Application Data

(60) Provisional application No. 63/274,035, filed on Nov. 1, 2021.

(51) Int. Cl.
*B25J 9/00* (2006.01)
*B25J 9/16* (2006.01)
(Continued)

(52) U.S. Cl.
CPC ............. *B25J 9/0006* (2013.01); *B25J 9/163* (2013.01); *B25J 9/1697* (2013.01); *B25J 13/086* (2013.01);
(Continued)

(58) Field of Classification Search
CPC ........ B25J 9/0006; B25J 9/163; B25J 9/1697; B25J 13/086; B25J 15/00; G05B 19/4155; G05B 2219/40269; G05B 2219/40202
(Continued)

(56) References Cited

U.S. PATENT DOCUMENTS 7,620,477 B2  11/2009  Bruemmer
9,486,918 B1  11/2016  Earl et al.
(Continued)

FOREIGN PATENT DOCUMENTS

CN  208459971 U  2/2019
CN  110825076 A  2/2020
(Continued)

OTHER PUBLICATIONS

Complete Specification of Indian Application No. 201821045158 filed Nov. 29, 2018, Title: Systems and Methods for Generating an Autonomous Robotic Action Framework, Applicant: Tata Consultancy Services Limited, 47 pgs.
(Continued)

*Primary Examiner* — Kira Nguyen
(74) *Attorney, Agent, or Firm* — BEKIARES ELIEZER LLP

(57) ABSTRACT

A robotic assistance device includes a robotic arm configured assist a human being and one or more sensors configured to receive input data. The input data includes information related to one or more activities being performed by the human being. The robotic assistance device further includes a processor operatively connected to the one or more sensors and the first robotic arm. The processor is configured to process data received from the sensor, and to determine, based on the processed data, that a task should be performed by the robotic assistance device based at least in part on the activities being performed by the human being. The processor is further configured cause the operative piece to perform the task.

20 Claims, 9 Drawing Sheets

(51) Int. Cl.
*B25J 13/08* (2006.01)
*G05B 19/4155* (2006.01)
*B25J 15/00* (2006.01)

(52) U.S. Cl.
CPC ........... *G05B 19/4155* (2013.01); *B25J 15/00* (2013.01); *G05B 2219/40269* (2013.01)

(58) Field of Classification Search
USPC ........................................................ 700/246
See application file for complete search history.

(56) References Cited

U.S. PATENT DOCUMENTS

| | | | |
|---|---|---|---|
| 9,586,315 | B2 | 3/2017 | Guerin et al. |
| 9,943,961 | B2 * | 4/2018 | Nakazato ........... G05B 19/4183 |
| 10,022,870 | B2 | 7/2018 | Guerin et al. |
| 10,300,606 | B2 | 5/2019 | Florencio et al. |
| 10,603,791 | B2 * | 3/2020 | Nakazato ........... G05B 19/4183 |
| 10,810,371 | B2 | 10/2020 | Shinn et al. |
| 10,839,017 | B2 | 11/2020 | Shinn et al. |
| 10,913,151 | B1 * | 2/2021 | Hinkle ..................... B25J 9/161 |
| 10,929,759 | B2 | 2/2021 | Shinn et al. |
| 10,963,493 | B1 | 3/2021 | Hu et al. |
| 2005/0223176 | A1 | 10/2005 | Peters, II |
| 2011/0184555 | A1 * | 7/2011 | Kosuge ................... B25J 11/00 700/245 |
| 2015/0001269 | A1 * | 1/2015 | Sacksteder ............. B25J 19/002 224/576 |
| 2015/0126558 | A1 * | 5/2015 | Iwabuchi ............. C07D 401/14 546/256 |
| 2017/0080561 | A1 * | 3/2017 | Meier ..................... B25J 9/1694 |
| 2017/0095382 | A1 * | 4/2017 | Wen ......................... A61G 5/04 |
| 2018/0005118 | A1 | 1/2018 | Kapoor et al. |
| 2018/0253662 | A1 | 9/2018 | Booch et al. |
| 2019/0105779 | A1 * | 4/2019 | Einav .................... B25J 9/1689 |
| 2019/0248015 | A1 | 8/2019 | Florencio et al. |
| 2019/0391597 | A1 | 12/2019 | Dupuis |
| 2020/0005162 | A1 | 1/2020 | Kattepur et al. |
| 2020/0121125 | A1 * | 4/2020 | Zito ........................ A47J 37/12 |
| 2020/0171671 | A1 | 6/2020 | Huang et al. |
| 2020/0218253 | A1 | 7/2020 | Ramamurthy et al. |
| 2020/0398422 | A1 | 12/2020 | Yufik et al. |
| 2021/0031364 | A1 | 2/2021 | Groz |
| 2021/0086370 | A1 | 3/2021 | Zhang et al. |
| 2021/0094175 | A1 * | 4/2021 | Maeda ...................... G06N 3/08 |
| 2021/0114239 | A1 | 4/2021 | Chanduri et al. |
| 2021/0330540 | A1 * | 10/2021 | Di Pardo ............... B25J 9/0006 |
| 2021/0394362 | A1 * | 12/2021 | Sodeyama ............... B25J 9/163 |
| 2022/0032454 | A1 * | 2/2022 | Yang ..................... B25J 9/1612 |

FOREIGN PATENT DOCUMENTS

| | | |
|---|---|---|
| WO | 2019209882 A1 | 10/2019 |
| WO | 2019234700 A1 | 12/2019 |
| WO | 2020113027 A2 | 6/2020 |

OTHER PUBLICATIONS

Complete Specification of Indian Application No. 202141006183, Filing Date: Unknown, Title: Artificial Neural Network Based Understanding Skills to Humanoid Robots for Observations of Human Actions, Applicant: Dr. K. Ravikumar et al., 9 pgs.

* cited by examiner

ROBOTIC ASSISTANCE DEVICE USING REDUCTION OF COGNITIVE LOAD OF A USER

RELATED APPLICATION

Under provisions of 35 U.S.C. § 119(e), the Applicant claims benefit of U.S. Provisional Application No. 63/274,035 filed on Nov. 1, 2021, and having inventors in common, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to robotic assistants. In particular, the disclosure relates to a robotic gripper for use in a workspace to reduce cognitive load on a human operator using the same workspace.

BACKGROUND

In some situations, a human operator may require assisting and/or coordinating actions to perform a task and/or to reduce attention switching required on the part of the human when performing the task. For example, in performing a complex task, a user may need to gather several tools and supplies, and switch between them repeatedly. This switching can increase cognitive load on the user. Thus, the conventional strategy is to gather needed supplies and tools, and array them in an accessible way around a workspace. This often causes problems because the conventional strategy does not address the cognitive load generated by having the clutter of such tools and supplies in the user's awareness (e.g., in the work area). Additionally, this strategy does not account for task-switch required on the part of the user to select a next tool or supply needed.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

A methodology is presented for providing robotic assistance in a workspace operated by a human operator. Additionally, several robotic assistance devices are described. Human activity is augmented by robotic devices that interact with the human being to help remove inefficiency of movement and unnecessary cognitive load on the part of the human being.

In a first aspect, a robotic assistance device includes a robotic arm configured assist a human being and one or more sensors configured to receive input data. The input data includes information related to one or more activities being performed by the human being. The robotic assistance device further includes a processor operatively connected to the one or more sensors and the first robotic arm. The processor is configured to process data received from the sensor, and to determine, based on the processed data, that a task should be performed by the robotic assistance device based at least in part on the activities being performed by the human being. The processor is further configured cause the operative piece to perform the task.

In a second aspect, a method for using a robotic assistance device includes receiving input data, including information related to one or more activities being performed by the human being and processing the received input to determine one or more assistance tasks based at least in part on the one or more activities being performed by the human being. The method may determine a response based, at least in part, on the processed input, and may cause the robotic assistance device to perform the one or more assistance tasks in response to the received input data.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
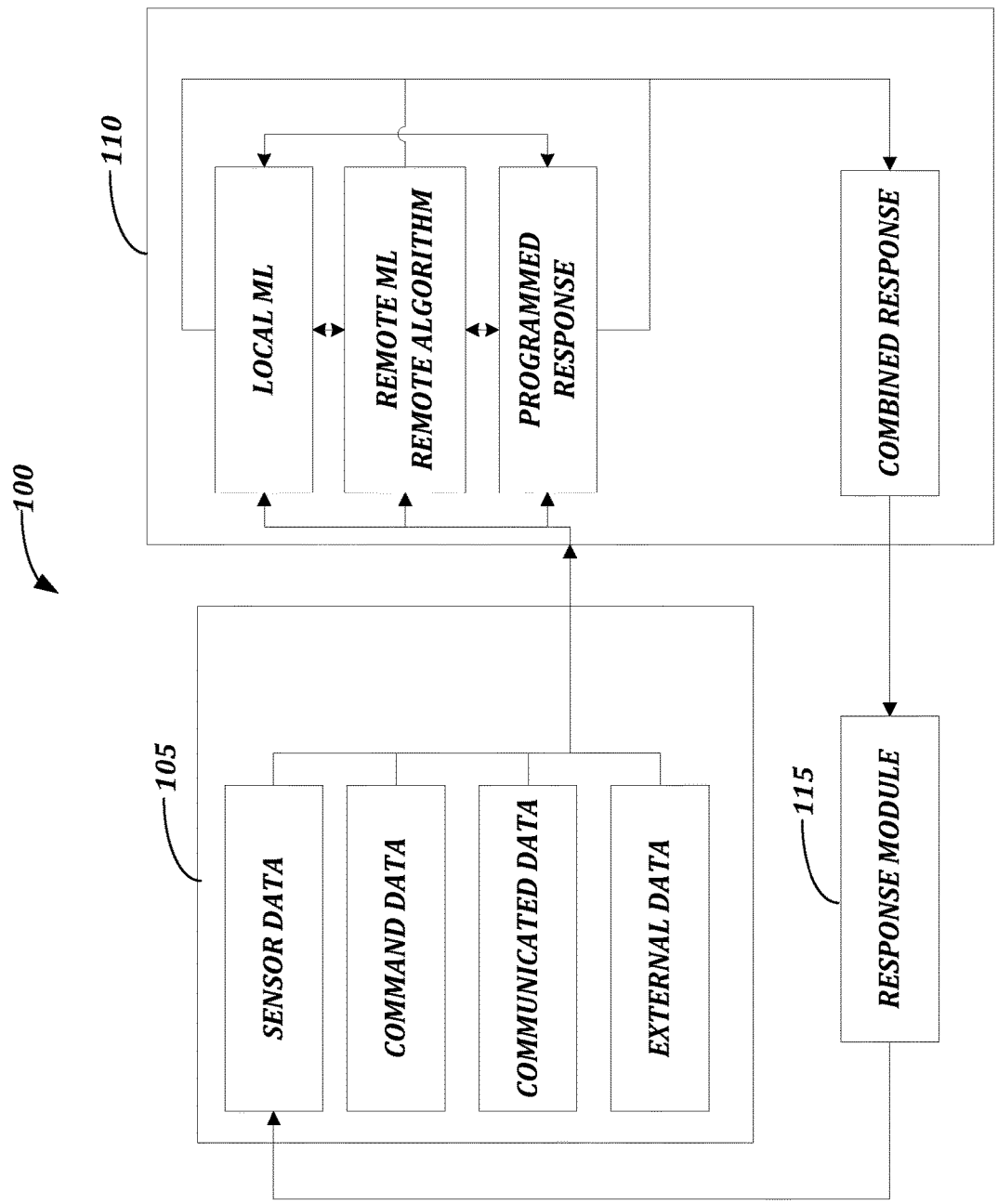
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of a human being operating on a workspace arranged substantially horizontally with respect to the human being, embodiments of the present disclosure are not limited to use only in this context.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

The methodology of creating meaningful human assistance makes use of a concept of a "cone of attention". In a situation where a human being (e.g., an operator or worker) is operating or working on a physical task in a workspace, using eye-hand coordination. The specifics of the task are relatively unimportant to the idea of providing assistance—other than that some level of eye-hand coordination is required on the part of the human being to perform the task, and that the task is localized to a particular workspace. These traits of the task being performed are common to many tasks. For example, soldering, surgery, cooking, watchmaking, and many other tasks.

Operator Attributes

Since the task involves some level of eye-hand coordination, the system may assume that an operator has at least some attributes of an idealized human (e.g., a human having two eyes horizontally positioned on a movable head, and two hands at the ends of arms attached to the same body as the head). However, the methodology may be extensible to workspaces that involve multiple humans (and therefore more eyes and hands) or workspaces where fewer eyes or hands are involved for whatever reason (e.g., due to injury).

In some embodiments, a generalized workspace may be horizontally arranged, with a concept of left and right, and with vision and head movements generally scanning left and right over the workpiece. Other movements (such as inspecting the underside of an item) may depart from the general case. In other embodiments, the workspace may be oriented differently (e.g., a generally vertical workspace), and/or may be of a different scale (e.g., smaller, such that head movement is not generally needed, larger, such that movement of the body may be contemplated in addition to movement of the head, etc.). The workspace may encompass a large variety of spaces.

The attributes of the idealized human being impose some spatial limits, due to the extent of reach of hands radially away from the body, and the relative discomfort involved with changing the elevation and angle of the head, and therefore the propensity to keep bodily movement variations, and volume of sweep, small.

Another limitation is the fact that as the task difficulty goes up, the "cone of attention" becomes narrower. The operator must "focus" literally more narrowly, in order to place maximum attention on the task. Difficulty may arise from one or more sources, including (a) difficulty of the task, and/or (b) any hindrances to achieving the task.

The human being is typically capable of managing the difficulty of the task. However, robotic assistance can substantially lessen many hindrances that are common to workspaces. Hindrances may include, as non-limiting examples, lack of the proper tool to complete a task or subtask, insufficient illumination for a task or subtask, and/or travel distance required to retrieve supplies. Robotic assistance may help in each of these cases, by providing the proper tool, assisting with proper illumination, or supplying or holding material or resources for a workspace. This allows the human operator to be free of managing such tasks, and may allow the operator to focus their attention (e.g., their cognitive resources) solely on the task to be completed. Thus, while the operator has more cognitive resources available for the task, the sum total of cognitive load is reduced. Reducing cognitive load may contribute probabilistically to a better outcome for the task. For example, the task may be completed faster, more efficiently, with a higher quality-output, or using any other measure of success in task completion. Additionally, in some cases, the robotic assistance device itself may act as a hindrance to the human being completing a task. Accordingly, the robotic assistance device may optionally be configured to retract partially or wholly to a support zone away from the activities performed by the human being when the robotic assistance device is not actively providing assistance (e.g., while inert or while passively engaged holding an item and/or waiting).

As discussed above, the operator may use a "cone of attention" to focus on tasks for eye-hand coordination purposes. For example, consider the "focused vision" of a human operator looking at a workspace. The human operator may be examining a workpiece on which he is operating, or may be cleaning up the workspace itself. The operator may focus their attention within the workspace. The area of vision where attention is placed may be considered to be easiest when the head and eyes are in a neutral position. It is possible, of course, to be focused on something off to one side, but generally human beings will turn to center the object of attention in their field of view. Humans generally look straight at a thing on which they are placing attention.

Figure 2:
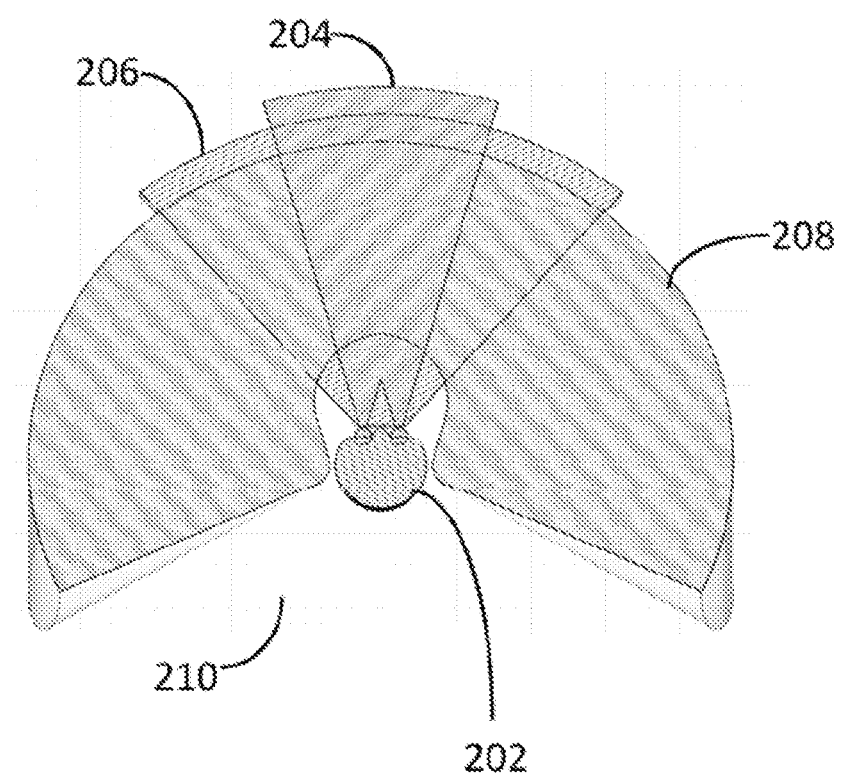
FIG. 2 is a schematic drawing illustrating zones of cognitive load consistent with the present disclosure.

As shown in FIG. 2, a human operator 202 is looking at a workspace 204. When looking (usually down) at the (usually horizontal) workspace 204, the "cone of attention" 206 of the operator 202 extends outward from the operator, widening angularly to the workspace 204. The cone of attention 206 is not equivalent to a cone of vision, though the concepts are related. That is, the cone of attention 206 is a subset of the cone of vision where the operator 202 is putting forth effort and attention (e.g., using mind and brain power) to understand and/or interact with elements in the workspace 204.

The operator 202 preferably keeps at least a portion of the workspace 204 within the cone of attention 206. If the task being performed by the operator 202 is particularly difficult, requiring more focus, the cone of attention 206 may become narrower in angular spread to focus on only the difficult task, excluding peripheral, static, or less important elements from the cone of attention 206.

This does not mean that the operator 202 pays no attention to things outside the cone of attention 206. For purposes of the following discussion, there may be at least four identified zones of relative attention. The next zone angularly outward from the cone of attention 206 is the "cone of awareness" 208. In the cone of awareness 208, the eyes of the operator 202 serve as the primary data input. Therefore, the cone of awareness 208 has a similar shape to the cone of attention 206, with a broader angular widening. In the cone of awareness 208 (outside of the cone of attention 206), the operator may receive visual information, but it is not expected to be important enough to devote significant cognitive resources to the visual information received. Accordingly, low cognitive load is expected in the cone of awareness 208 and outside the cone of attention 206. That is, the operator 202 does not provide focused attention in the cone of awareness 208. As examples, the cone of awareness 208 may include objects in peripheral vision, objects in direct view on which the operator does not need to place attention (e.g., a tool currently not being used, but soon to be used).

Further outward is an "ambient zone" 210. The ambient zone 210 produces even less cognitive load for the operator 202, and therefore even less attention is placed on it, with respect to the workplace 204. The ambient zone 210 may be characterized by auditory, olfactory, and/or other environmental signals. In some cases, far peripheral vision may also be involved, but typically does not include focused vision of the operator 202. The ambient zone 210 typically represents an area of a workspace 204 with which the operator 202 is not interacting to accomplish the task. Nevertheless, some finite amount of attention is placed on the ambient zone 210 to detect changes in the ambient conditions which could potentially affect execution of the task. As non-limiting examples, a loud crash, a particular smell (e.g., smoke), and/or sound from a person walking in may all be environmental events in the ambient zone 210 that may cause awareness and possibly attention by the operator 202 to be turned away from the task for assessment.

A fourth zone may be the non-ambient zone (not shown). The non-ambient zone is nota physical zone, but rather includes sensations outside of the cone of attention 206, the cone of awareness 208, and the ambient zone 210. For example, the non-ambient zone may include knowledge of time passing, inability to focus due to fatigue, and/or other non-environmental factors that may consume attention and awareness of the operator 202.

Workspace Attributes

Figure 3A:
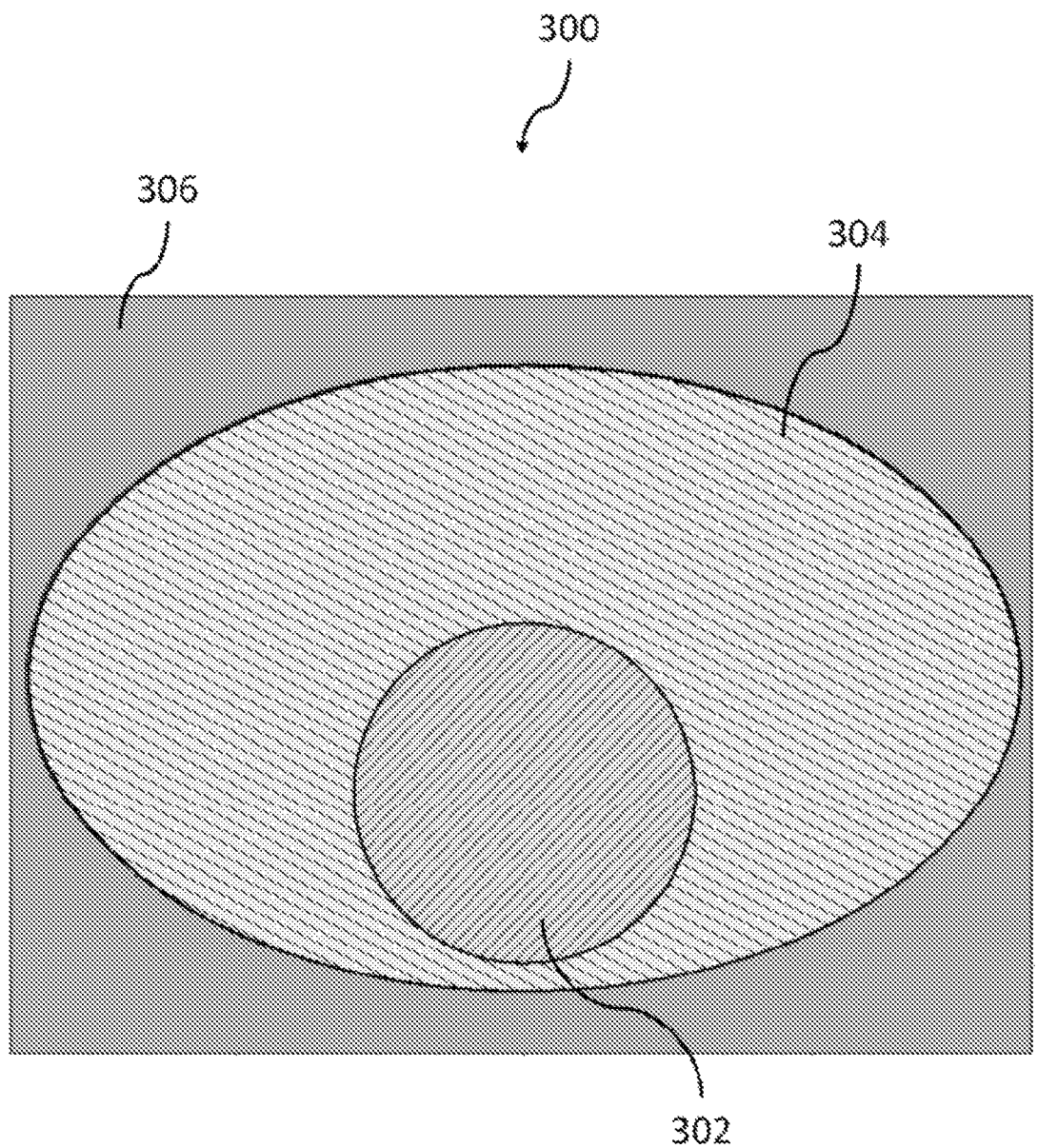
FIG. 3A is a schematic drawing illustrating a conventional work area zone consistent with the present disclosure.

FIG. 3A shows an overhead view of a conventional work area 300. The work area 300 may include any area in which an operator performs a task. In some embodiments, the work area 300 is a horizontal work surface such as a table. In other embodiments (e.g., for a surgeon), the work area 300 might be inside a human body that has been opened via incision. In still other embodiments, the work area 300 may be a portion of a body. For example, the work area 300 may be any portion of the operator's body. Typically, the work area 300 is horizontally arranged, with an operator (e.g., operator 202 as shown in FIG. 2) positioned in front of the workspace. In some embodiments, the work area 300 may include a larger space, such as a room or a portion thereof. In some embodiments, the work area may be extremely large, so as to be practically unbounded. In some embodiments, the work area 300 may represent a delineated space (e.g., a particular table, room, or building). In other embodiments, the work area 300 may be defined with respect to the operator (e.g., the work area encompasses a ten-foot radius surrounding the operator, and moves as the operator moves). The work area 300 may be divided into zones arranged with respect to the cone of attention of the operator, and each zone may have a size and/or a shape that depends on one or more of a location, a size, and/or an orientation of the work area 300. In embodiments, the work area may be an area having a standard environment at near-standard atmospheric conditions, such as a room, a building, or similar. In other embodiments, the workspace may have non-standard conditions, including non-standard environments (e.g., underwater conditions, partial vacuum conditions, etc.). Additionally, while FIG. 3A shows the work area 300 as a human-scale work area, those of skill in the art will appreciate that the work area may be much smaller than human scale (e.g., micro-scale, nanoscale) or much larger than human scale. Note that while FIG. 3A shows the work area 300 as a rectangular shape (e.g., a desktop, tabletop, or similar), the work area may be bigger, smaller, and/or differently shaped. Additionally, while the work area 300 as shown is sized to be a desktop area, the work area is not constrained to occupy a desktop or work surface. The work area 300 may optionally include, and be sized for, a work surface of any shape or size. The work area 300 is not intended to be constrained to any particular size, shape, location, or condition.

In embodiments, the work area 300 may include a workspace zone 302 where the task is occurring. In embodiments a workpiece (not shown) may be positioned within the workspace zone 302. Typically, a cone of attention for an operator performing the task (e.g., cone of attention 206) coincides substantially with the workspace zone 302 while the operator is performing the task. In a work area 300, the workspace zone 302 may take up the central region. Note that while FIG. 3A shows the workspace zone 302 as an oval shape, the workspace zone may be bigger or smaller, or differently shaped. The workspace zone 302 is generally sized and shaped based, at least in part, on the task to be completed by the operator.

External to the workspace zone 302, the work area 300 may include a near periphery zone 304. The near periphery zone 304 may include support items for performance of the task, such as tools and/or other supplies. Typically, the near periphery zone 304 corresponds roughly to the cone of awareness (e.g., cone of awareness 208) of the operator. Note that while FIG. 3A shows the near periphery zone 304 as an oval shape, the near periphery zone may be bigger or smaller, or differently shaped.

External to the near periphery zone 304, the work area 300 may include a far periphery zone 306. The far periphery zone 306 may include the portions of the work area 300 that are not included within the near periphery zone 304 or the workspace zone 302. The far periphery zone 306 may include objects that are relatively unrelated to the task, but which may exist for other reasons. As particular examples, the far periphery 306 may include objects pertinent to a different task that also occurs at the work area 300, and/or decorative objects. Note that while FIG. 3A shows the far periphery zone 306 as a rectangular shape with an oval shape cutout, the far periphery zone may be bigger or smaller, or differently shaped.

In a conventional (non-robotically assisted) work area 300, the operator must interact with the near periphery zone 304 to obtain tools and supplies. The operator may interact with the outer periphery 306 as well, for instance to clear more space for more tools, enlarging the near periphery zone 304.

In embodiments, the near periphery zone 304 is relatively large in comparison to the workspace zone 302. Accordingly, tracking the area of the near periphery zone 304 may require a relatively large cone of awareness. Additionally, a more complex task may require a correspondingly more complex and/or larger near periphery zone 304, with different tools, smaller tools, and/or a larger variety of supplies. This increase in complexity and/or size of the near periphery zone 304 may cause a corresponding increase in the amount of cognitive load that monitoring the near periphery zone creates. The increase in cognitive load required for monitoring the near periphery zone 304 may take an operator's cognitive resources away from the cone of attention and the workspace zone 302, which should be kept on the task being performed (e.g., in the workspace zone 302). The additional cognitive load being used to track the near periphery zone 304 may cause narrowing of the cone of attention, and create even more demand on the cone of awareness. Thus, increases in the size and/or complexity of the near periphery zone 304 generally correspond to an overall increase in the energy required to keep spatially balanced attention on both the task and the tools and supplies that support the task.

One strategy to allow a user to expend additional energy and attention within the workspace zone 302 (and within the cone of attention) is to remove objects from the near periphery zone 304, reducing the size and complexity of the near periphery zone and reducing cognitive load required by the operator to monitor the near periphery zone. This is possible when an assistant can handle and track tools and supplies. One well-known example of such a strategy is that of a surgeon who has assistants to handle the tools and supplies, and to provide the tools and supplies to the surgeon when needed. Such assistance, and assistance of many additional types, may be provided by robotic devices.

Figure 3B:
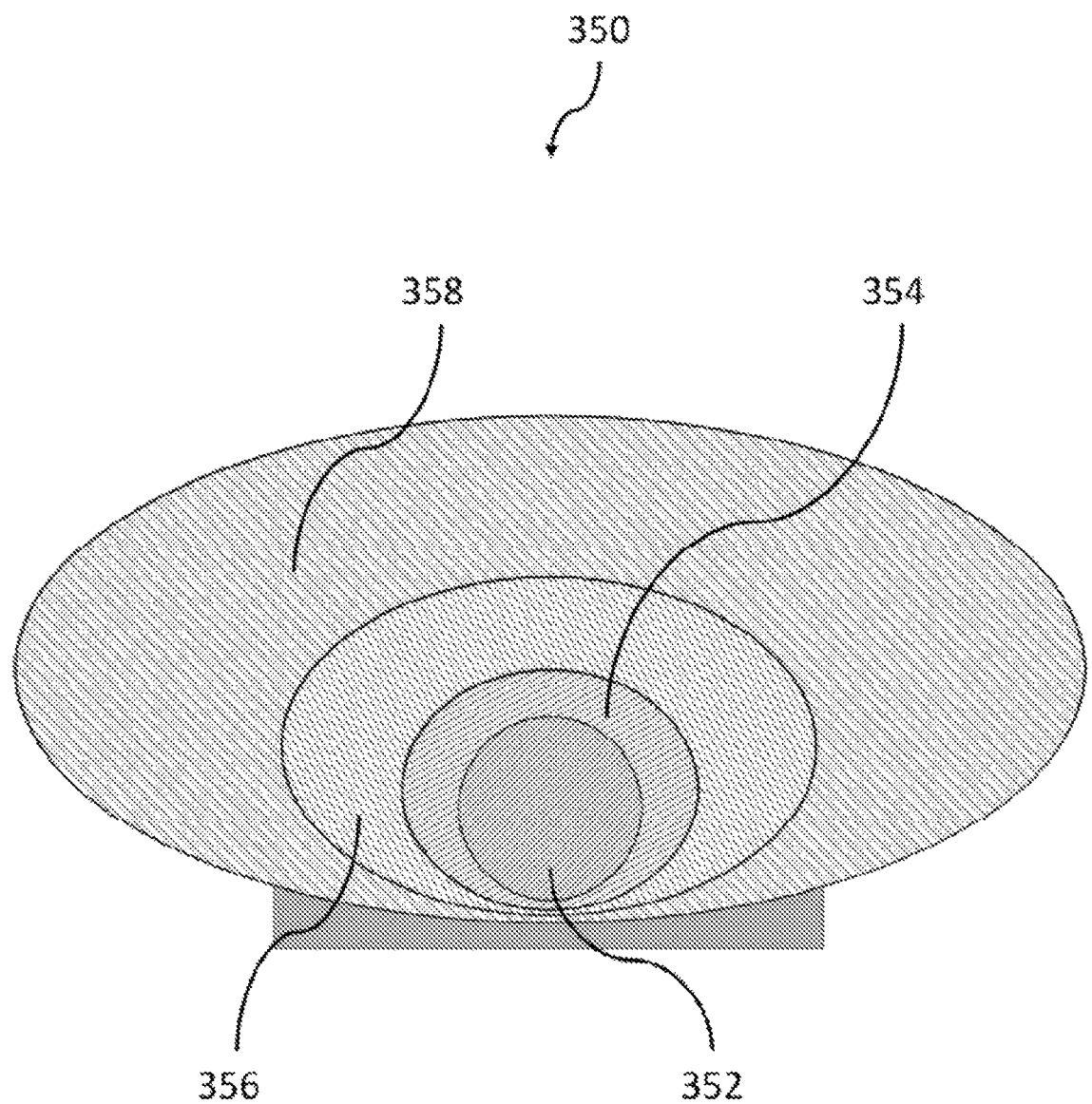
FIG. 3B is a schematic drawing illustrating a robot-assisted work area zone consistent with the present disclosure.

FIG. 3B shows an overhead view of a robot-assisted work area 350. As with conventional work area 300, in some embodiments, the work area 350 is a horizontal work surface such as a table. In other embodiments (e.g., for a surgeon), the work area 350 may be inside a human body that has been opened via incision. Typically, the work area 350 is horizontally arranged, with an operator (e.g., operator 202 as shown in FIG. 2) positioned in front of the work area. In some embodiments, the work area 350 may include a larger space, such as a room or a portion thereof. The work area 350 may be divided into zones arranged with respect to the cone of attention of the operator, and each zone may have a size and/or a shape that depends on one or more of a location, a size, and/or an orientation of the work area 350. Note that while FIG. 3B shows the work area 350 as a rectangular shape, the work area may be bigger or smaller, or differently shaped.

In cases where the operator is being assisted (e.g., by a robot and/or a human), the operator's cone of awareness may be greatly reduced, allowing the operator extra cognitive resources to devote to his task in the workspace zone 352. In embodiments a workpiece (not shown) is positioned within the workspace zone 352. Typically the cone of attention (e.g., cone of attention 206) coincides with the workspace zone 352 while the operator is performing a task. In a work area 350, the workspace zone 352 takes up the central region. Note that while FIG. 3B shows the workspace zone 352 as an oval shape, the workspace zone may be bigger or smaller, or differently shaped.

The operator may need to interact with the assistant to complete at least certain portions of the task. An interaction region may be excluded by the actual workspace zone 352, but it is useful if the tool or supply comes close to the task (and thus, close to the workspace zone 352). This may help to prevent attention switching to retrieval, and may reduce overall cognitive load, allowing focus to remain on the task in the workspace zone 352. Accordingly, an interaction zone 354 may be defined adjacent to the workspace zone 352. In embodiments, the interaction zone 354 may be a relatively narrow zone, as compared to the workspace zone 352. In order to help improve efficiency of the operator, the assistant may determine where (e.g., at what stage, step, or procedure) in the task the operator is, what tool or supply is required next, and/or anticipate any need of the operator. In some embodiments, training of the assistant is required. This can be the case for robotic and/or non-robotic assistants. Note that while FIG. 3B shows the interaction zone 354 as an oval shape, the interaction zone may be bigger or smaller, or differently shaped. Defining the interaction zone 354 to be adjacent to the workspace zone 352 and surrounding the workspace zone may allow for a smaller cone of awareness, allowing for attention resources of the operator to be kept on the task in the workspace.

In some embodiments (e.g., with a robotic assistant) a support zone 356 is defined outside the interaction zone 354. In the support zone 356, one or more end-effectors of the assistant may be supported. For example, at least a portion of a robot that is necessary to interact with the operator may be stored in the support zone 356. In some embodiments, the entirety of the robot is stored in the support zone 356. The support zone 356 supports the end-effector of the assistance robot, which enters the interaction zone 354 to interact with the operator. The assistant robot may supply a tool or some material (e.g., glue, tape, workpiece parts, etc.) required for the task in the workspace 352. In some embodiments, the assistant robot may retract partially or optionally wholly to the support zone 356. Alternatively, the end effector of the assistant robot may remain in the interaction zone 354 while not in active use. In embodiments, while the end effector of the assistant robot may be in the interaction zone 354, other portions of the robot that do not interact directly with the operator may be disposed in the support zone 356. Note that while FIG. 3B shows the support zone 356 as an oval shape, the support zone may be bigger or smaller, or differently shaped. However, the support zone 356 is outside the interaction zone 354, which is outside the workspace zone 352. Accordingly, the support zone 356 may occupy very little (e.g., including none) of the cone of awareness of the operator, and preferably none of the cone of attention of the operator.

In embodiments, responsive to a determination that the operator requires an item (e.g., a tool or supply), the assistant may place an end-effector that holds the item into the interaction zone 354 to place the item into the cone of awareness, close to cone of attention, allowing for very little attention switching, and producing very little cognitive load. The determination that the operator requires the item may include, but not be limited to, for example, processing of sensor data to determine that a user needs an item and/or training data to determine the required item.

Outside the support zone 356 is a reservoir zone 358 which may aid the support zone by supplying the assistant with necessary items. For example, the reservoir zone 358 may contain items used to perform one or more tasks, such as inventory items (e.g., parts and/or fasteners), non-discrete supplies (e.g., solvent, soap, and/or paint), discrete supplies (e.g., individual paper towels, cotton balls, and/or swabs), continuous supplies (e.g., wire, thread, and/or rope), and/or tools. In some embodiments, the reservoir zone 358 may include storage for waste products of the task, or temporary storage of unused items.

Accordingly, storage may effectively be moved further away from the workspace zone 352 because of the effective conveyance of items from further away (e.g., the reservoir zone 358) to the operator (e.g., at the interaction zone 354) by the assistant.

Assistance allows storage to be moved further from the work area, narrowing the cone of awareness, and reducing cognitive load. In some embodiments, the assistant may access objects (e.g., supplies and/or tools) stored in the relatively remote reservoir zone 358 and convey the objects to the interaction zone 354. In some embodiments, the objects may be stored, for example, at the far periphery of the work area 350, under the work area, and/or above the work area, at one or more locations where the storage space does not encroach upon the awareness or attention of the operator.

Because the operator is typically looking downward at the workspace, there may be an area above the work area in which one or more assistant devices may be placed. Positioning at least a portion of the assistant devices above the work area 350 allows the assistant devices (and a respective portion of the interaction area for use by each device) to be more spread out. This may help reduce cognitive load because the operator does not have to spend as much attention to discern between items needed when the items are positioned more distantly from one another.

Moreover, the operator may look up to put an item in a zone above the workspace into the cone of attention, while keeping the zone of awareness on the workspace. This is a move requiring very little cognitive effort, but may be included in a process for completing a task. For example, the operator may glance up at a device displaying a sensor reading to be able to continue with the task. While attention may be moved to the display (and thus away from the workspace), a smaller movement requires less effort and less cognitive load.

When using robotic assistance, a zone can be defined where robot end-effectors are positioned. The end-effectors may include screens containing displays and/or any other type of assistance robot (e.g., dispensers and/or tool handlers). As one example, robotic end effectors may be disposed in the interaction zone 354, In some embodiments, the robotic end effectors may be disposed at other portions of the workplace in which they may be accessible (e.g., visible, able to be reached, etc.) by the operator.

In at least some embodiments, there is at least one other zone outside the reservoir zone 358. The at least one other zone may include an infrastructure zone (not shown). The infrastructure zone 358 may contain infrastructure-level requirements that may or may not be external to the building or the complex in which the workspace exists. For example, the infrastructure zone 358 may include power or water supply, heating ventilation and air conditioning (HVAC) equipment, and/or other infrastructure that may be needed for the task and/or the robots (e.g., compressed air or other process gases such as nitrogen, cryogenic agents, deionized water, and/or drainage). In some embodiments, the infrastructure zone 358 contains other infrastructure level requirements that are not involved with handling by a robot end-effector, but which may be necessary for robot operation, or performing the task in some way.

There may be a significant amount of unused volume around and behind the head of the operator. For example, the area in front of the operator's body (e.g., between the operator and the workspace), and the area behind the operator are outside of both the cone of attention and the cone of awareness. In particular, the area behind the operator may be considered part of the space that the operator experiences as the ambient zone, as discussed above. Accordingly, the area behind the operator may be well suited for use as a reservoir zone or support zone. The area in front of the operator may enter the operator's awareness zone. However, an assistance device could exist in this space, either wholly or in part. An active device may be positioned in the area in front of the operator. As a particular example, a small gripper configured to temporarily hold the operator's magnifying glasses may be used. It may make sense for such a device to be mounted to the work-area—(e.g., to a table in the workspace 350), or to be mounted on the operator directly (e.g., work on the operator's chest).

The area behind and around the head may also be of interest. The area behind the plane of vision is nearly entirely in the ambient zone. Provided no stimulus exists to raise awareness, this zone does not create much cognitive load for the operator. Such stimulus might be, for example, a pressure point, excessive weight, or something noisy. Without such disturbing stimuli, the area behind and around the head is fairly ambient. An assistance device with an interaction zone in the outer edge of the cone of awareness near the side of the head may be able to be head-mounted. For example, a head-mounted camera or a robotic illuminator, that visually understands the workpiece in the workspace from the vantage point of the head, and continually aims a light at the workspace (or a particular workpiece in the workspace).

Other spaces or mounting methods are not excluded by this methodology. For instance, on the operator's body, leg-mounted devices could be useful. Additionally, floor-mounted devices can be useful, including mobile platform mounted devices.

Robotic Assistance

The following describes a generalized methodology by which robotic assistance may be provided to an operator by a robotic assistance device. Some components described may be optional, depending on the intended function of the robotic assistance device.

There are at least three targets of assistance. The targets of assistance are areas and/or objects upon which a robotic assistance device may perform an action. Three example targets of assistance are: the operator, the workpiece and/or the workspace, and the work area (e.g., the area surrounding the workspace). In embodiments, each robotic assistance device may be targeted to provide the proper assistance to the proper target.

First, robotic assistance devices may target the operator directly. For example, a robotic assistance device directly assisting the operator with an operation may include a robotic gripper that temporarily grips a tool in the workspace periphery and returns the tool to the operator when needed. Such robot assists the operator by cutting down the time to search for, identify, and retrieve a needed tool.

Second, robotic assistance devices may target the workspace and/or a workpiece within the workspace. For example, a robotic gripper may hold a workpiece in position while an operator completes a task on the workpiece.

Third, a robotic assistance device may target the work area. A work area targeted robot may include a robot that is concerned with maintaining proper conditions in the work area. As a particular example, a robotic assistance device may include a gripper robot holding a small vacuum to pull in solder fumes close to where they are being generated on a workpiece. In some embodiments, the robotic assistance device may perform movements to stay very close to the workpiece while staying out of the way of the operator performing the task. In some embodiments, machine learning and/or pattern recognition may allow a robotic assistance device to anticipate future movements of the operator, and coordinate movement of the robotic assistance device with the operator movement, and movement of any other assistance robots. Thus, the robotic assistance device may interact with the operator and the workpiece, but the target is the work area.

In some embodiments, a robotic assistance device may be arbitrarily very advanced, detecting conditions with multiple sensors and applying Machine Learning at the device to classify a type of assistance required and identity of the user, and transmitting such data to a remote processor that might also use Machine Learning to detect the appropriate response using external data such as weather conditions or time of day; it might have complex motion control allowing significant motion interaction with the user; it may understand the existence of other motion controlled assistance robots in the interaction zone, and coordinate with them to avoid each other or work in concert.

In other embodiments, a robotic assistance device may be arbitrarily simple, with a user proximity detector and no other sensors, using a pre-programmed sequence to execute operations responsive to a user entering the interaction zone and, optionally, in response to one or more additional pre-programmed conditions being met.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1 illustrates one possible operating environment through which a platform consistent with embodiments of the present disclosure may be provided. A robotic assistance device platform 100 may include local components or modules. In some embodiments, one or more components and/or modules may be remote from the robotic assistance device platform. By way of non-limiting example, one or more components and/or modules of the robotic assistance device platform 100 may be hosted on, for example, a cloud computing service. In some embodiments, the platform 100 may be hosted on a computing device 500. A user may access platform 100 through a software application and/or hardware device. The software application may be embodied as, for example, but not be limited to, a website, a web application, a desktop application, and a mobile application compatible with the computing device 500, discussed in more detail below. The platform 100 may include a data input module 105, a data processing module 110, and a response module 115.

A. Data Input Module

The data input module 105 includes various hardware and/or software for collecting data from other devices and/or the area surrounding the robotic assistance device. For example, the data input module 105 may include sensors and/or data communication interfaces (e.g., peer-to-peer connection interfaces, network connection interfaces, etc.). Decisions regarding how and/or when to transition between phases of operation are typically made based at least in part on data received via the data input module. There are at least four types of input data that may be received at the data input module 105. The received data may be used as at least part of a basis for moving between phases. These input data are: sensor data, communicated data, command data, and external data. Additional and/or different data types may also be received as input data.

Sensor data may include data that is local to the robotic assistance device, gathered by one or more sensors of the robotic assistance device. In embodiments, a robotic assistance device may include one or more sensors that collect data continuously, periodically, or intermittently. The one or more sensors may include, for example, a switch (and an on/off position of the switch as the resulting data), light detection and ranging (LIDAR) devices, cameras, and/or ultrasonic distance ranging sensors. There are many types of sensors that may be useful in operation of a robotic assistance device. Each sensor may return some data (complex or simple).

Communicated data may include data that originates outside of the robotic assistance device. The communicated data may be locally communicated to the robotic assistance device from another device, without involving any remote data transfer. For example, communicated data may be transferred using a peer-to-peer data connection. Peer-to-peer communications are often used to provide real-time response. These connections typically work well for coordination of local devices. Data may also be communicated to the robotic assistance device from a remote system. The data from the remote system may be, for example, relayed sensor data from other devices, data from other sources entirely (e.g., weather forecasts from an external weather monitoring service), or any other data from a nearby device.

Command data may include data arising from one or more instruction sets that may be accessed via a local sensor (e.g., a pause button on the robotic assistance device) and/or via communication (e.g., a command from a remote system to shut down or enter a maintenance mode). Command data may include data that may override or augment other data received from in the data input module 105. For example, pressing a pause button may override any sensor data that would normally cause a robotic assistance device to act. As another example, a verbal command given by the human user to the device may be augmented by command data; specifically, the audio stream including the verbal command is received as sensor data, but that data may be processed for meaning, and the resulting meaning may be transmitted to the robotic assistance device as command data which is used to augment the audio stream.

External data may include data from external sources. For example, external data may include schedules and timers, or lookup tables with temperature thresholds for a substance. The external data may be used in algorithms by the robotic assistance device. For example, information regarding fragility of a particular object to be gripped (external data) may be useful data for a gripping device handling the particular object to take into account. External data may be communicated and refreshed or updated periodically, may be held locally in memory, or may be pre-programmed into the robotic assistance device.

B. Data Processing Module

The data received at the data input module is processed by the data processing module 110. In embodiments, the data processing module may include one or more microprocessors and/or software for use in processing the received data. In embodiments, the microprocessors may be local to the robotic assistance device. In some embodiments, one or more microprocessors used by the data processing module 110 may be remote from the robotic assistance device. The data processing performed by the data processing module 110 may include, but not be limited to, an algorithm for generating a programmed response to the input data, application of local and/or remote machine learning models for using the input data to select a response based various machine learning criteria, or any other processing of data received by the data processing module 110.

In some embodiments, the data processing module 110 may include an algorithm for selecting a programmed response to be effected based at least in part on the received data. The algorithm may select a response based entirely or in part on the data from the data input module. In a simple example, a length of time of close proximity (e.g., proximity less than a threshold distance) may be detected by a sensor, and the algorithm may determine a threshold condition (e.g., a threshold time) for action, and may specify the action.

In some embodiments, the data processing module 110 may include local and/or remote machine learning models. Sensor data may be augmented by the other data types as input. The augmented sensor data may be processed by, as an example, neural network Machine Learning, or other AI methods. As a particular example, the data processing module 110 may employ a locally stored Machine Learning model for the purposes of classifying the input sensor data (e.g., for gesture or verbal audio stream analysis). The input sensor data may also be exported off device to a remote server for processing. The remote system may apply machine learning and/or an algorithmic approach to the data.

In some embodiments, the data processing module 110 may include a machine learning engine. Machine learning includes various techniques in the field of artificial intelligence that deal with computer-implemented, user-independent processes for solving problems that have variable inputs.

In some embodiments, the machine learning engine trains a machine learning model to perform one or more operations. Training a machine learning model uses training data to generate a function that, given one or more inputs to the machine learning model, computes a corresponding output. The output may correspond to a prediction based on prior machine learning. In an embodiment, the output includes a label, classification, and/or categorization assigned to the provided input(s). The machine learning model corresponds to a learned model for performing the desired operation(s) (e.g., labeling, classifying, and/or categorizing inputs). For example, the machine learning model may be used in determining a likelihood of a transaction to complete a stage in particular amount of time.

In an embodiment, the machine learning engine may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine receives positive and/or negative reinforcement in the process of attempting to solve a particular problem (e.g., to optimize performance in a particular scenario, according to one or more predefined performance criteria). In an embodiment, the machine learning engine initially uses supervised learning to train the machine learning model and then uses unsupervised learning to update the machine learning model on an ongoing basis.

In an embodiment, a machine learning engine may use many different techniques to label, classify, and/or categorize inputs. A machine learning engine may transform inputs (e.g., the augmented sensor data) into feature vectors that describe one or more properties ("features") of the inputs. The machine learning engine may label, classify, and/or categorize the inputs based on the feature vectors. Alternatively or additionally, a machine learning engine may use clustering (also referred to as cluster analysis) to identify commonalities in the inputs. The machine learning engine may group (i.e., cluster) the inputs based on those commonalities. The machine learning engine may use hierarchical clustering, k-means clustering, and/or another clustering method or combination thereof. In an embodiment, a machine learning engine includes an artificial neural network. An artificial neural network includes multiple nodes (also referred to as artificial neurons) and edges between nodes. Edges may be associated with corresponding weights that represent the strengths of connections between nodes, which the machine learning engine adjusts as machine learning proceeds. Alternatively or additionally, a machine learning engine may include a support vector machine. A support vector machine represents inputs as vectors. The machine learning engine may label, classify, and/or categorizes inputs based on the vectors. Alternatively or additionally, the machine learning engine may use a naïve Bayes classifier to label, classify, and/or categorize inputs. Alternatively or additionally, given a particular input, a machine learning model may apply a decision tree to predict an output for the given input. Alternatively or additionally, a machine learning engine may apply fuzzy logic in situations where labeling, classifying, and/or categorizing an input among a fixed set of mutually exclusive options is impossible or impractical. The aforementioned machine learning model and techniques are discussed for exemplary purposes only and should not be construed as limiting one or more embodiments.

In an embodiment, as a machine learning engine applies different inputs to a machine learning model, the corresponding outputs are not always accurate. As an example, the machine learning engine may use supervised learning to train a machine learning model. After training the machine learning model, if a subsequent input is identical to an input that was included in labeled training data and the output is identical to the supervisory signal in the training data, then output is certain to be accurate. If an input is different from inputs that were included in labeled training data, then the machine learning engine may generate a corresponding output that is inaccurate or of uncertain accuracy. In addition to producing a particular output for a given input, the machine learning engine may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

The results of any remote processing may be stored for later use by the remote system, but also may be fed back as communicated data to the device. The local processing or ML systems may include the remotely processed data as an input to another layer of local ML input, and/or as an input to local algorithmically programmed response. In some embodiments, sensor fusion and external systems with computation power greater than that of the data processing module 110 may augment the behavior of the local device, in coordination with other nearby devices.

In embodiments, the results of the algorithmic and local and/or remote machine learning models based on the data input may be combined to form a combined response.

C. Response Module

The combined response from the data process module 110 may be passed to the response module 115 for effecting execution of the combined response by the robotic assistance device. The response module 115 may include one or more controllers configured to control one or more motors of the robotic assistance device. In embodiments, the response module 115 may receive the combined response, and may provide a signal to one or more (e.g., each) controller for effecting the combined response. In some embodiments, the response module 115 may provide a signal including at least a portion of the combined response to the data input module 105.

III. Platform Operation

Embodiments of the present disclosure provide a hardware and software platform operative by a set of methods and computer-readable media comprising instructions configured to operate the aforementioned modules and computing elements in accordance with the methods. The following depicts an example of at least one method of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, at least one computing device 500 may be employed in the performance of some or all of the stages disclosed with regard to the methods. Similarly, an apparatus may be employed in the performance of some or all of the stages of the methods. As such, the apparatus may comprise at least those architectural components as found in computing device 500.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

A. Method of Using a Robotic Gripper

Consistent with embodiments of the present disclosure, a method may be performed by at least one of the aforementioned modules. The method may be embodied as, for example, but not limited to, computer instructions, which when executed, perform the method.

The following depicts an example of a method of a plurality of methods that may be performed by at least one of the aforementioned devices, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device may be employed in the performance of some or all of the stages disclosed with regard to the methods. Similarly, an apparatus may be employed in the performance of some or all of the stages of the methods.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Figure 4:
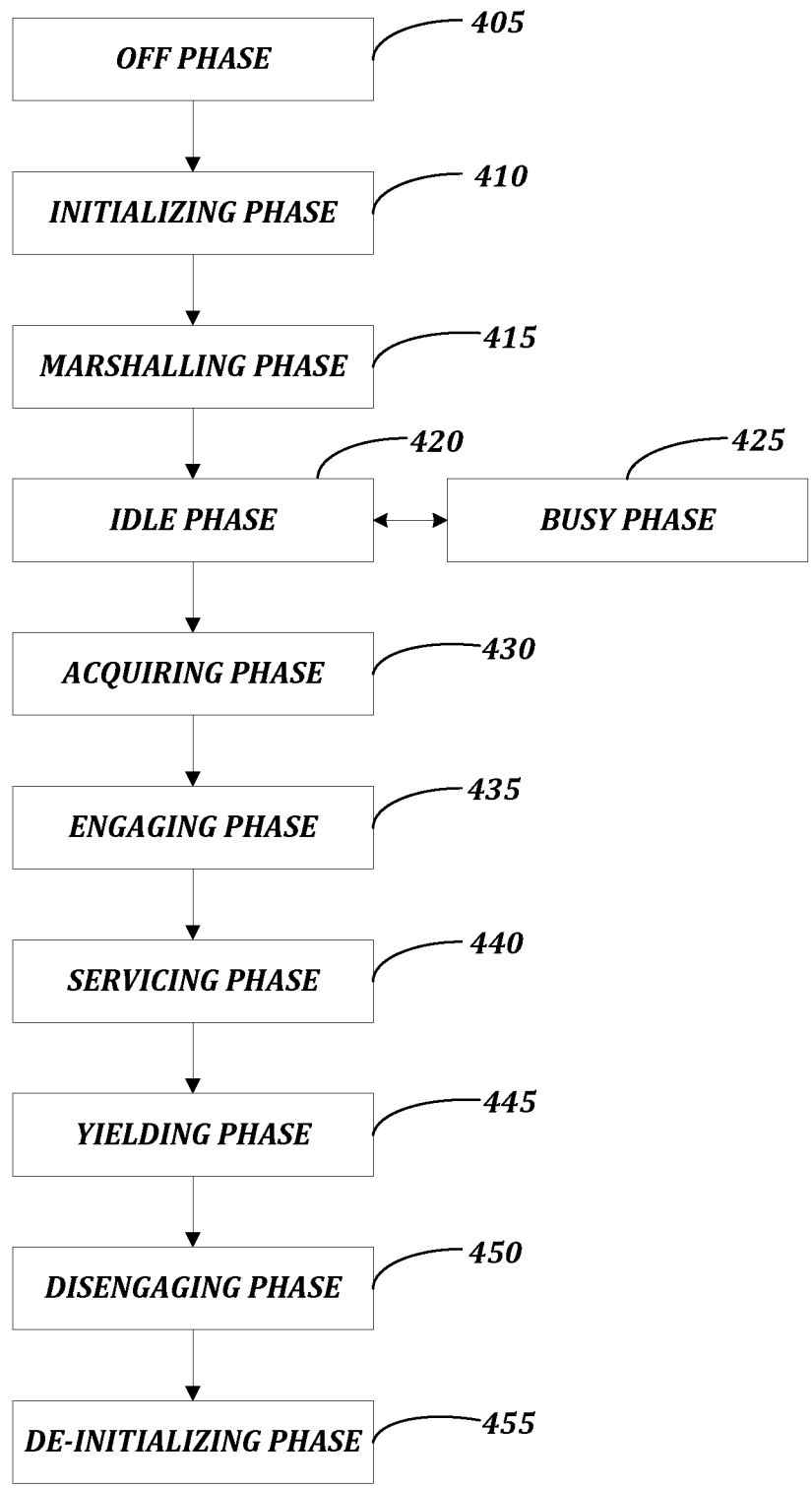
FIG. 4 is a flow chart of a method for providing a robotic assistance device for reducing cognitive load of a user.

FIG. 4 is a flow chart setting forth the general stages involved in a method 400 consistent with an embodiment of the disclosure for providing robotic assistance device platform 100. Method 400 may be implemented using a computing device 500 or any other component associated with platform 100 as described in more detail below with respect to FIG. 6. For illustrative purposes alone, computing device 500 is described as one potential actor in the follow stages.

Method 400 may begin at stage 405, where a robotic assistance device may be in a power-saving or "off" phase. The robotic assistance device may not receive power, or may be in a sleep mode. Based at least in part on actions of an operator, such as the operator connecting the robotic assistance device to a power source, activating a powering mechanism (e.g., a power switch), or causing the robotic assistance device to activate via another command (e.g., a "wake word", a particular action, a particular time of day, etc.).

Following activation from a power saving phase in stage 405, the robotic assistance device may proceed to stage 410 (an initialization phase), where computing device 500 may cause the robotic assistance device perform various operations to prepare the device to engage in robotic assistance. In embodiments, the initialization may be based on one or more of, as non-limiting examples, the hardware included in the robotic assistance device, an intended use of the robotic assistance device, a workspace in which the robotic assistance device is positioned, an operator associated with the robotic assistance device, and/or any other characteristic associated with the robotic assistance device.

As an example, the initialization phase may include the robotic assistance device calibrating one or more sensors, and/or allowing one or more sensors to reach a steady state. As another example, the robotic assistance device may establish one or more data connections to one or more respective remote devices. As yet another example, the robotic assistance device may unlock one or more motors for motion control. In some embodiments, initialization may include determining that one or more safety conditions of the device are met and/or that the device is in an appropriate physical orientation.

Following the initialization phase of stage 410, the robotic assistance device may optionally proceed to stage 415 (a marshalling phase). In marshalling, the computing device 500 may cause the robotic assistance device to determine if one or more conditions that are not device-dependent are ready for service. For example, a robotic gripper device may determine that its interaction zone is free of obstructions. If a robotic assistance device fails one or more marshalling determinations, the device may engage in corrective action to marshal resources. In embodiments, the corrective action may include alerting an operator. For example, a robotic gripper may emit a visual and/or auditory alert in response to determining that one or more obstructions are present in the workspace. In some embodiments, the robotic assistance device may repeat the marshalling phase until all marshalling determinations are successful.

Once the marshalling phase is successfully completed, the robotic assistance device may proceed to stage 420 (an idle phase). In the idle phase, the computing device 500 may cause the robotic assistance device to collect data from one or more sensors. In embodiments, the data may include information related to a potential activation of the robotic assistance device. The data may include, for example, positional information related to a proximity of an operator and/or a workpiece to an interaction zone of the robotic assistance device.

In some embodiments, the device may proceed to stage 425 (a busy state). The busy state may be entered based on a determination, made using collected sensor data and/or other data inputs (timers, schedules, etc.), that the robotic assistance device is unlikely to provide robotic assistance in the near future (e.g., in the next 5 seconds, 10 seconds, 30 seconds, etc.). Based on this determination, the robotic assistance device may perform a self-activation or remote activation to cause the device to perform maintenance and/or cleanup activity. In particular, during the busy phase, the computing device 500 may cause the robotic assistance device to perform testing of motors to ensure function, lubrication of the robotic arms and/or end-effectors, and/or a remote software update (e.g., to improve device Machine Learning training models). The busy state may render the robotic assistance device at least partially incapable of providing assistance services. In some embodiments, the robotic assistance device may move to a new position when entering the busy state, to indicate to the operator that the device is out of service. Upon completion of the maintenance and/or cleanup activity, the robotic assistance device may return to the idle phase 420.

In some embodiments, responsive to sensor data and/or other data inputs (timers, schedules, etc.) indicating that robotic assistance is desired or may be desired soon, the robotic assistance device may proceed to stage 430 (an acquiring state). In the acquiring state, the computing device 500 may cause the robotic assistance device to confirm a detected request for robotic assistance, or discard the detected request for robotic assistance as erroneous or aborted. In some embodiments, the request may comprise an express request (e.g., a verbal or physical command issued from a user) and/or an implied request (e.g., a user moving towards the robotic assistance device or otherwise demonstrating an intent to use the robotic assistance device). Confirming the detected request may include performing one or more calculations based on the received request to determine that a likelihood that the user intends to interact with the robotic assistance device exceeds a threshold value. In some embodiments, the acquiring phase occurs prior to the robotic assistance device rendering any assistance and may be prior to any robotic motion. In other embodiments, robotic motion may be part of confirming the request for assistance. In the acquiring state, the robotic assistance device is not idle because it is applying computation power to confirming the request for assistance. As a particular example, a proximity detector of a robotic assistance device may periodically check for an operator's threshold proximity within the interaction zone while in the idle state; in the acquiring state the sample rate of the proximity sensor may increase, the robotic assistance device may start to track a velocity of change of the proximity sensor measurements, and determine the continued existence of an object within the threshold proximity in the interaction zone.

While in the acquiring state, a first robotic assistance device may optionally establish communication with one or more nearby second robotic assistance devices. Communication between the first robotic assistance device and the one or more second robotic assistance devices may override the detected request for robotic assistance. That is, one of the second robotic assistance devices may have been the actual intended target, thereby informing the first robotic assistance device that the first device is not the target. Responsive to such communication between the first device and the second device, the first device may move to a second location, farther away from the user.

Responsive to confirming the request for robotic assistance (e.g., by performing the one or more calculations as discussed above) in the acquiring phase, the robotic assistance device may proceed to stage 435 (an engaging phase). In the engaging phase 435 the computing device 500 may cause the robotic assistance device to commit to an interaction with the operator. The robotic assistance device may optionally begin coordination with the operator. In embodiments, the operator may also be moving. Thus, the robotic assistance device may enter coordinated motion with the operator to optionally bring the robotic assistance device into a particular position relative to the operator. This coordinated motion distinguishes the engaging phase from the acquiring phase. In other embodiments, the robotic assistance device may remain stationary to await interaction from the operator.

As a particular example, a robotic gripper device may use a camera or other optical sensor to determine a shape and/or an object classification of an object to be gripped by the device. The robotic gripper device may process the object classification (e.g., by performing a database lookup in a remote database) to determine an expected weight range of the object, an expected size of the object, and or an expected grip force required to grip the object. The robotic gripping device may configure an end-effector and/or a supporting arm of the robotic gripping device to accept an object based on the determined object characteristics.

The robotic assistance device may proceed to stage 440 (a servicing phase). In the servicing phase the computing device 500 may cause the robotic assistance device to render assistance to an operator. For example, a robotic gripping device may grip an object. There are many types of assistance that may be offered by robotic assistance devices. In embodiments, the servicing phase may be substantially instantaneous (e.g., gripping a tool). During the servicing phase, the robotic assistance device itself may determine that at least some portion of the robotic assistance device is serving as a hindrance to the human being completing a task. Accordingly, the robotic assistance device may optionally be configured to retract partially or optionally wholly to a support zone away from the activities performed by the human being when the robotic assistance device is not actively providing assistance (e.g., while passively engaged holding an item and/or waiting).

Following the servicing phase, the robotic assistance device may proceed to stage 445 (a yielding phase). In the yielding phase, the computing device 500 may cause the robotic assistance device to detect, using one or more sensors and/or other data inputs (timers, schedules, etc.), a request for the robotic assistance device to stop providing the service. For example, a robotic gripper device that is holding an object may detect when it should release the object. In the yielding phase, the robotic gripping device may continue servicing (gripping) while attempting to detect one or more conditions for ending the service. As a particular example, the request to stop providing the service may include the operator tugging on the object. A more advanced gripper might detect user proximity as well, to add the criterion that an operator is proximate to the robotic gripper device to receive the released object. Such sensing is part of the yielding criteria. Once the yielding criteria are met), the robot moves to the disengaging phase.

The robotic assistance device may proceed to stage 450 (a disengaging phase). In the disengaging phase, the computing device 500 may cause the robotic assistance device to take steps to end assistance service. The robotic assistance device may optionally de-couple from coordination with the operator. For example, a robotic gripping device may release a gripped object. Upon conclusion of the disengaging phase the robotic assistance device may be de-coupled from providing assistance, and may optionally remove the end-effector from the interaction zone. The robotic assistance device may determine if the device is able to provide more assistance in the future. If not, the device may return to the marshalling phase. Otherwise, the device may return directly to the idle phase.

Responsive to an indication that the robotic assistance device is to shut down (e.g., one or more sensor readings, one or more operator commands, external input from a scheduler and/or timer, etc., the robotic assistance device may proceed to stage 455 (a de-initialization phase). In the de-initialization phase, the computing device may cause the robotic assistance device to perform one or more actions to prepare for shutdown. For example, the robotic assistance device may end one or more data connections cleanly with exit messages to remote servers, may move one or more motors to a neutral or safe position, may discharge one or more capacitors, may purge one or more liquid tubes, and/or may return one or more material resources to a reservoir zone. There are many actions that may take place as part of the de-initialization phase. In embodiments, the actions taken by the robotic assistance device during de-initialization represent everything that is needed to properly return the robotic assistance device to an "off" phase.

B. Alternate Method of Using a Robotic Gripper

Consistent with embodiments of the present disclosure, a method may be performed by at least one of the aforementioned modules. The method may be embodied as, for example, but not limited to, computer instructions, which when executed, perform the method.

The following depicts an example of a method of a plurality of methods that may be performed by at least one of the aforementioned devices, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device may be employed in the performance of some or all of the stages disclosed with regard to the methods. Similarly, an apparatus may be employed in the performance of some or all of the stages of the methods.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Figure 5:
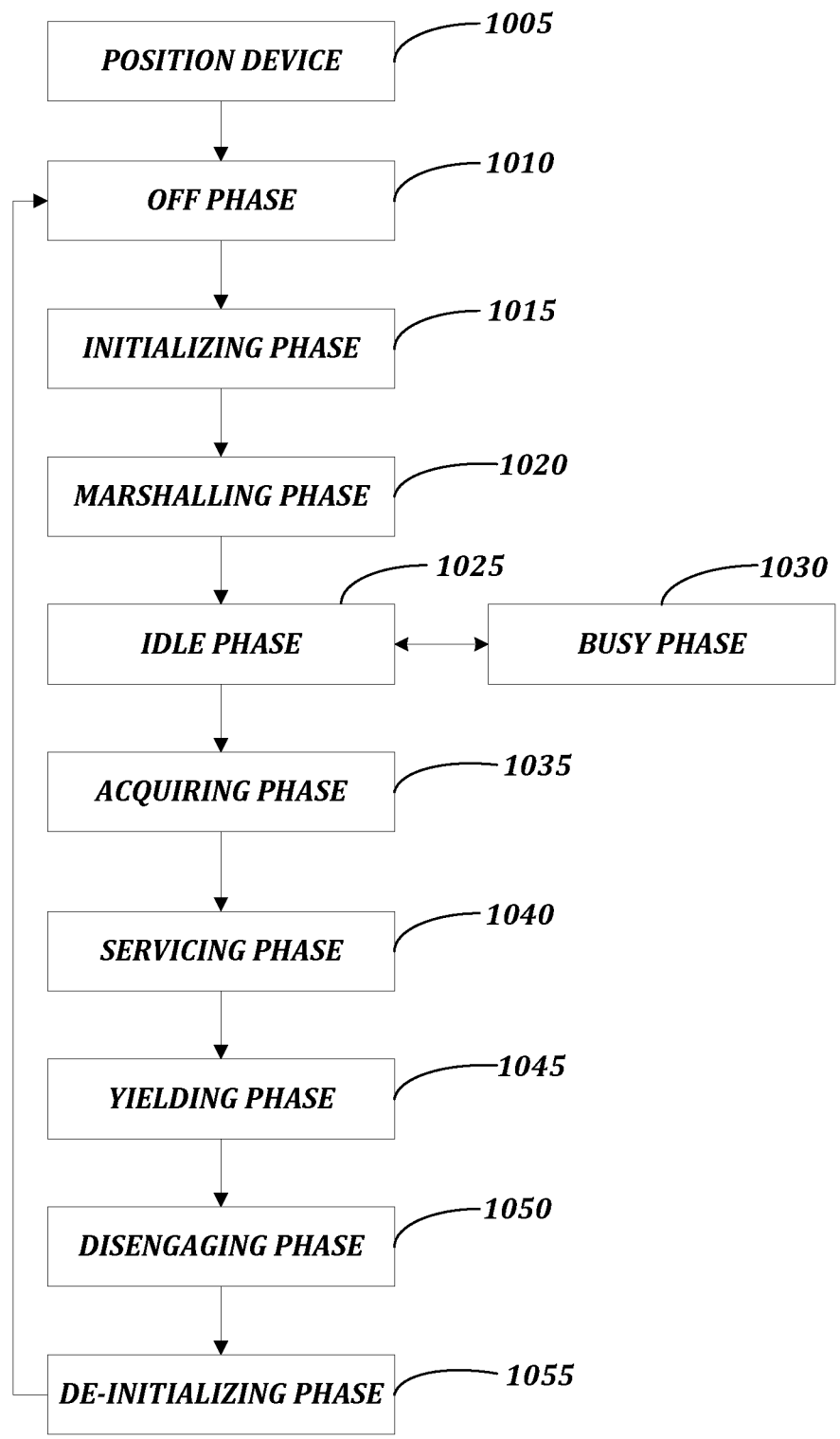
FIG. 5 is a flow chart of a method for providing a robotic assistance device for reducing cognitive load of a user.

FIG. 5 is a flow chart setting forth the general stages involved in a method 1000 consistent with an embodiment of the disclosure for providing robotic assistance device platform 100. Method 1000 may be implemented using a computing device 500 or any other component associated with platform 100 as described in more detail below with respect to FIG. 6. For illustrative purposes alone, computing device 500 is described as one potential actor in the follow stages.

Method 1000 may begin at stage 1005, where a robotic assistance device may be positioned in a workspace. In embodiments, the robotic assistance device may be a statically-positioned assistance device. For example, the assistance device may be a gripping device on a static arm that does not move with respect to the user. Accordingly, positioning the device requires a user to determine an optimal or desired gripper placement with respect to the workspace. Generally, the gripper may be positioned in any portion of the workspace that does not inhibit or block the user's access to the workpiece. The robotic assistance device may be in a power-saving or "off" phase when positioned by the user. The robotic assistance device may not receive power, or may be in a sleep mode.

In stage 1010, the user may activate the robotic assistance device. Based at least in part on actions of an operator, such as the operator connecting the robotic assistance device to a power source, activating a powering mechanism (e.g., a power switch), or causing the robotic assistance device to activate via another command (e.g., a "wake word", a particular action, a particular time of day, etc.).

Following activation from a power saving phase in stage 1010, the robotic assistance device may proceed to stage 1015, an initialization phase. During the initiation, the robotic assistance device may perform various operations to prepare the device to engage in robotic assistance. In embodiments, the initialization may be based on one or more of, as non-limiting examples, the hardware included in the robotic assistance device, an intended use of the robotic assistance device, a workspace in which the robotic assistance device is positioned, an operator associated with the robotic assistance device, and/or any other characteristic associated with the robotic assistance device.

As an example, the initialization phase may include the robotic assistance device calibrating one or more sensors, and/or allowing one or more sensors to reach a steady state. In some embodiments, initialization may include determining that one or more safety conditions of the device are met and/or that the device is in an appropriate physical orientation.

Following the initialization phase of stage 1015, the robotic assistance device may optionally proceed to stage 1020, a marshalling phase. In marshalling, the robotic assistance device may determine if one or more conditions that are not device-dependent are ready for service. For example, a robotic gripper device may determine that its interaction zone is free of obstructions. If a robotic assistance device fails one or more marshalling determinations, the device may engage in corrective action. In embodiments, the corrective action may include alerting an operator. For example, a robotic gripper may emit a visual and/or auditory alert in response to determining that one or more obstructions are present in the workspace. In some embodiments, the robotic assistance device may repeat the marshalling phase until all marshalling determinations are successful.

Once the marshalling phase 1020 is successfully completed, the robotic assistance device may proceed to stage 1025, an idle phase. In the idle phase, the robotic assistance device may collect data from one or more sensors. In embodiments, the data may include information related to a potential activation of the robotic assistance device. The data may include, for example, positional information related to a proximity of an operator and/or a workpiece to an interaction zone of the robotic assistance device.

In some embodiments, the device may proceed to stage 1030, a busy state. The busy state may be entered based on a determination, made using collected sensor data and/or other data inputs (timers, schedules, etc.), that the robotic assistance device is unlikely to provide robotic assistance in the near future (e.g., in the next 5 seconds, 10 seconds, 30 seconds, etc.). Based on this determination, the robotic assistance device may perform maintenance and/or cleanup activity. In particular, during the busy phase, the computing device 500 may cause the robotic assistance device to perform testing of motors to ensure function, lubrication of the end-effectors, and/or a remote software update. The busy state may render the robotic assistance device at least partially incapable of providing assistance services for a short time. In some embodiments, the robotic assistance device may indicate to the operator that the device is out of service (e.g., by changing a status light color). Upon completion of the maintenance and/or cleanup activity, the robotic assistance device may return to the idle phase 1025.

In embodiments, responsive to sensor data and/or other data inputs (timers, schedules, etc.) indicating that robotic assistance is desired or may be desired soon, the robotic assistance device may proceed to stage 1035, an acquiring state. In the acquiring state, the computing device 500 may cause the robotic assistance device to confirm a detected request for robotic assistance, or discard the detected request for robotic assistance as erroneous or aborted. In embodiments, the request may comprise an express request (e.g., a verbal or physical command issued from a user) and/or an implied request (e.g., a user moving towards the robotic assistance device or otherwise demonstrating an intent to use the robotic assistance device). Confirming the detected request may include performing one or more calculations based on the received request to determine that a likelihood that the user intends to interact with the robotic assistance device exceeds a threshold value. In some embodiments, the acquiring phase occurs prior to the robotic assistance device rendering any assistance.

In the acquiring state, the robotic assistance device is not idle because it is applying computation power to confirming the request for assistance. As a particular example, a proximity detector of a robotic assistance device may periodically check for an operator's threshold proximity within the interaction zone while in the idle state; in the acquiring state the sample rate of the proximity sensor may increase and determine the continued existence of an object within the threshold proximity in the interaction zone.

The robotic gripper device may use a camera or other optical sensor to determine a shape and/or an object classification of an object to be gripped by the device. The robotic gripper device may process the object classification (e.g., by performing a database lookup in a remote database) to determine an expected weight range of the object, an expected size of the object, and or an expected grip force required to grip the object. The robotic gripping device may configure an end-effector and/or a supporting arm of the robotic gripping device to accept an object based on the determined object characteristics.

The robotic assistance device may proceed to stage 1040, a servicing phase. In the servicing phase the robotic assistance device may render assistance to an operator. For example, a robotic gripping device may grip an object. There are many types of assistance that may be offered by robotic assistance devices. In embodiments, the servicing phase may be substantially instantaneous (e.g., gripping a tool).

Following the servicing phase, the robotic assistance device may proceed to stage 1045, a yielding phase. In the yielding phase, the computing device 500 may cause the robotic assistance device to detect, using one or more sensors and/or other data inputs (timers, schedules, etc.), a request for the robotic assistance device to stop providing the service. For example, a robotic gripper device that is holding an object may detect when it should release the object. In the yielding phase, the robotic gripping device may continue servicing (gripping) while attempting to detect one or more conditions for ending the service. As a particular example, the request to stop providing the service may include the operator tugging on the object. Once the yielding criteria are met), the robot moves to the disengaging phase.

The robotic assistance device may proceed to stage 1050, a disengaging phase. In the disengaging phase, the computing device 500 may cause the robotic assistance device to take steps to end assistance service. For example, a robotic gripping device may release a gripped object. The robotic assistance device may determine if the device is able to provide more assistance in the future. If not, the device may return to the marshalling phase. Otherwise, the device may return directly to the idle phase.

Responsive to an indication that the robotic assistance device is to shut down (e.g., one or more sensor readings, one or more operator commands, external input from a scheduler and/or timer, etc., the robotic assistance device may proceed to stage 1055 (a de-initialization phase). In the de-initialization phase, the computing device may cause the robotic assistance device to perform one or more actions to prepare for shutdown. For example, the robotic assistance device may end one or more data connections cleanly with exit messages to remote servers, may move one or more motors to a neutral or safe position, may discharge one or more capacitors, may purge one or more liquid tubes, and/or may return one or more material resources to a reservoir zone. There are many actions that may take place as part of the de-initialization phase. In embodiments, the actions taken by the robotic assistance device during de-initialization represent everything that is needed to properly return the robotic assistance device to an "off" phase and await activation (e.g., in stage 1010).

Embodiments of the present disclosure provide a hardware and software platform operative as a distributed system of modules and computing elements.

Platform 100 may be embodied as, for example, but not be limited to, a website, a web application, a desktop application, backend application, and a mobile application compatible with a computing device 500. The computing device 500 may comprise, but not be limited to one or more of the following:

A mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series; and A microcomputer, wherein the microcomputer computing device comprises, but is not limited to, a server, wherein a server may be rack mounted, a workstation, an industrial device, a raspberry pi, a desktop, or an embedded device.

Platform 100 may be hosted on a centralized server or a cloud computing service. Although method 400 has been described to be performed by a computing device 500, it should be understood that, in some embodiments, different operations may be performed by a plurality of the computing devices 500 in operative communication at least one network.

Embodiments of the present disclosure may comprise a system having a central processing unit (CPU) 520, a bus 530, a memory unit 540, a power supply unit (PSU) 550, and one or more Input/Output (I/O) units. The CPU 520 coupled to the memory unit 540 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages any method disclosed herein.

Figure 6:
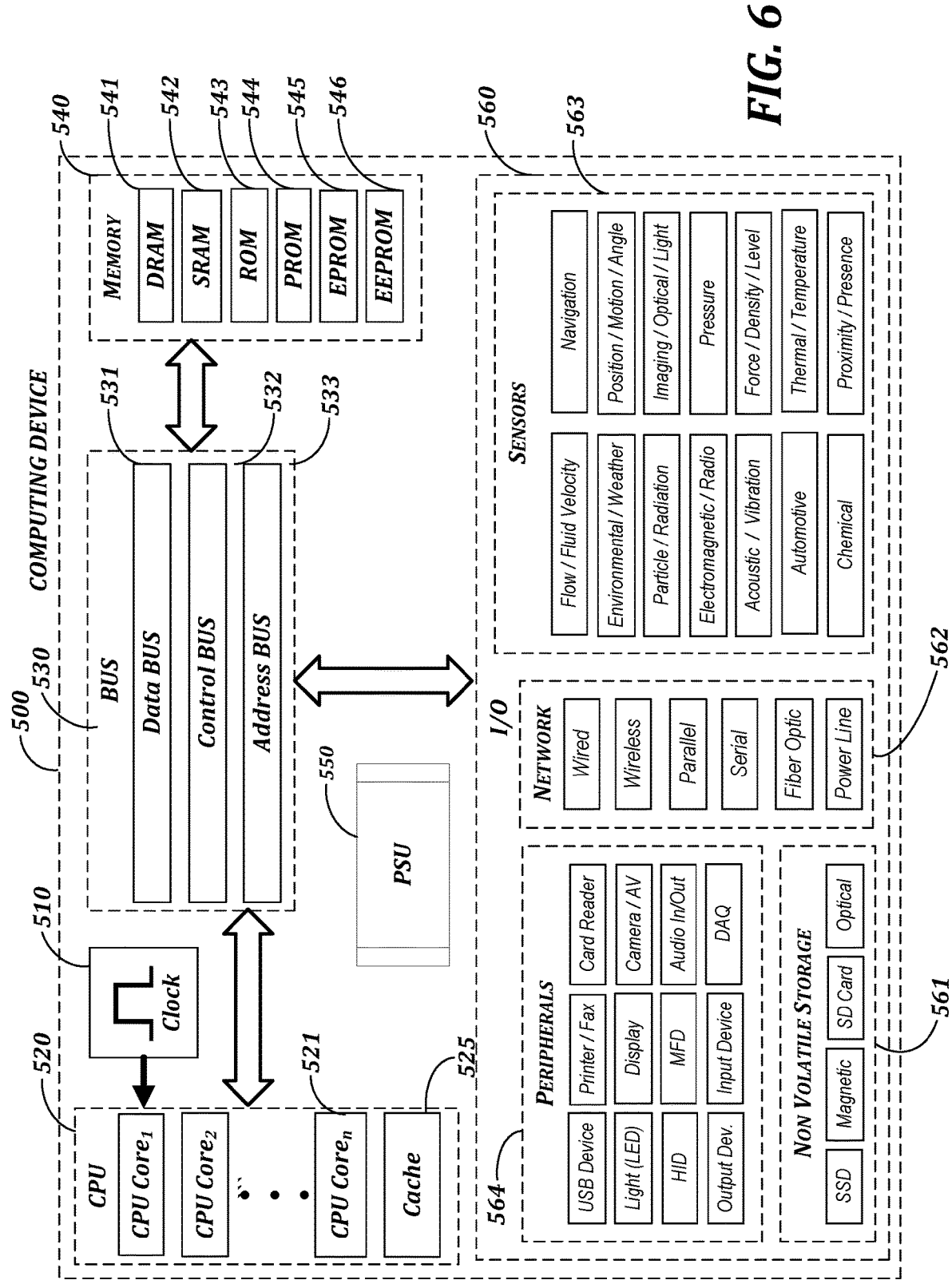
FIG. 6 is a block diagram of a system including a computing device for performing the method of FIG. 4 and/or FIG. 5.

FIG. 6 is a block diagram of a system including computing device 500. Consistent with an embodiment of the disclosure, the aforementioned CPU 520, the bus 530, the memory unit 540, a PSU 550, and the plurality of I/O units 560 may be implemented in a computing device, such as computing device 500 of FIG. 6. Any suitable combination of hardware, software, or firmware may be used to implement the aforementioned units. For example, the CPU 520, the bus 530, and the memory unit 540 may be implemented with computing device 500 or any of other computing devices 500, in combination with computing device 500. The aforementioned system, device, and components are examples and other systems, devices, and components may comprise the aforementioned CPU 520, the bus 530, the memory unit 540, consistent with embodiments of the disclosure.

At least one computing device 500 may be embodied as any of the computing elements illustrated in all of the attached figures. A computing device 500 does not need to be electronic, nor even have a CPU 520, nor bus 530, nor memory unit 540. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 6, a system consistent with an embodiment of the disclosure may include a computing device, such as computing device 500. In a basic configuration, computing device 500 may include at least one clock module 510, at least one CPU 520, at least one bus 530, and at least one memory unit 540, at least one PSU 550, and at least one I/O 560 module, wherein I/O module may be comprised of, but not limited to a non-volatile storage sub-module 561, a communication sub-module 562, a sensors sub-module 563, and a peripherals sub-module 564.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 540 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 540, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, superscalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus
Control bus 532
Address bus 533
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).

Music Instrument Digital Interface (MIDI)

Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 500 may employ hardware integrated circuits that store information for immediate use in the computing device 500, know to the person having ordinary skill in the art as primary storage or memory 540. The memory 540 operates at high speed, distinguishing it from the non-volatile storage sub-module 561, which may be referred to as secondary or tertiary storage, which provides slow-to-access information but offers higher capacities at lower cost. The contents contained in memory 540, may be transferred to secondary storage via techniques such as, but not limited to, virtual memory and swap. The memory 540 may be associated with addressable semiconductor memory, such as integrated circuits consisting of silicon-based transistors, used for example as primary storage but also other purposes in the computing device 500. The memory 540 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 541, Static Random-Access Memory (SRAM) 542, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 543, Programmable ROM (PROM) 544, Erasable PROM (EPROM) 545, Electrically Erasable PROM (EEPROM) 546 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 564. The plurality of hardware is used by the at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using intermediate area in the memory 540. The non-volatile storage sub-module 561 does not lose data when power is removed and may be two orders of magnitude less costly than storage used in memory module, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be said are networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:
 Wired communications, such as, but not limited to, coaxial cable, phone lines, twisted pair cables (ethernet), and InfiniBand.
 Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).
 Parallel communications, such as, but not limited to, LPT ports.
 Serial communications, such as, but not limited to, RS-232 and USB.
 Fiber Optic communications, such as, but not limited to, Single-mode optical fiber (SMF) and Multi-mode optical fiber (MMF).
 Power Line communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:
 Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).
 Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 564 comprises ancillary devices uses to put information into and get information out of the computing device 500. There are 3 categories of devices comprising the peripheral sub-module 564, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 564:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, which require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Robotic actuators, which cause movement of at least a portion of the robotic assistance device, may include electric motors that rotate a wheel or gear, linear actuators that extend or retract to cause linear movement, series elastic actuators, pneumatic artificial muscles, shape memory alloy wire, electroactive polymers, piezoelectric motors, elastic nanotubes, and the like.

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC).

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

IV. Example Robotic Assistance Devices

Many different robotic assistance devices have been discussed in some detail above, and many devices are possible using the methodologies discussed above. In embodiments, a robotic assistance device may include any robotic device operating within a work area to reduce cognitive load of an operator. The following are non-limiting examples of robotic assistance devices using the robotic assistance platform 100.

A. Simple Robotic Gripper

Figure 7:
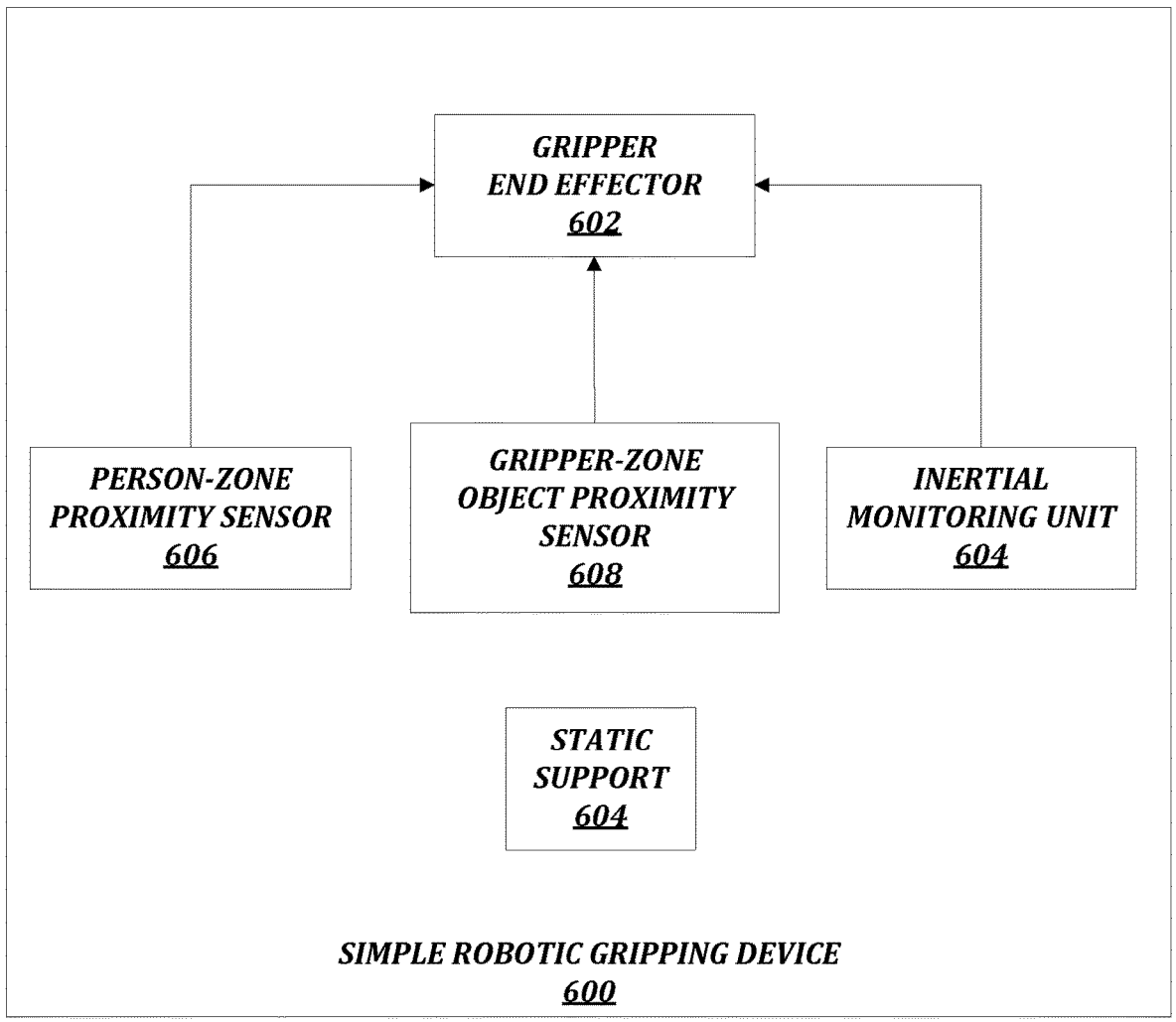
FIG. 7 is a block diagram of a first robotic gripping device consistent with the present disclosure.

FIG. 7 illustrates a block diagram for a simple gripper 600. The gripper 600 may be formed as a robotic gripper 602 on a static support or arm 604. In some embodiments, the arm 604 may be stationary. In other embodiments, the arm 604 may be movable about a fixed point of rotation. The static support 604 may be affixed (e.g., mounted) to a fixed point within the workspace. For example, the arm may be mounted to a table in the workspace, to a floor in the workspace, or to any other fixed location in the workspace. In other embodiments, the arm may be removably attached to a human being (e.g., an operator or user). For example, the arm may secure around the neck of a user, on a mounting point connected to a vest or apron of the user, or at any other location on the user.

The gripper 602 may have a particular morphology selected for a specific task, or may have a morphology suitable for many tasks. As particular examples, the gripper 602 may be an impactive gripper (e.g., jaws, clamps, claws, fingers, etc. which physically grasp by direct impact upon an object to be gripped), an ingressive gripper (e.g., pins, needles, hackles, etc. that physically penetrate a surface of an object to be gripped), an astrictive gripper (e.g., using attractive forces such as vacuum, magneto adhesion, and/or electro adhesion), and/or a contigutive gripper (e.g., using direct contact adhesion such as glue, surface tension, etc.). There are many types of grippers that may be applicable to certain jobs or may be particularly well-suited for handling particular materials.

Optionally, the simple gripper 600 may include one or more sensors. For example, the one or more sensors may include a person-zone proximity sensor 606 (e.g., an infrared emitter-detector pair) and/or a gripper-zone object proximity sensor 608 (e.g., a Time-Of-Flight sensor). In some embodiments, a single sensor device (e.g., a camera) may serve as both the person-zone proximity sensor 606 and the gripper-zone object proximity sensor 605. In some embodiments, the one or more sensors may include an Inertial Monitoring Unit (IMU) 610 configured to detect small impacts or accelerations of the gripper.

Responsive to determining that an object is in the open gripper's grip zone (e.g., as sensed by the gripper-zone object proximity sensor 606), the gripper 62 may close or otherwise retain the object in the grip zone. In embodiments, the gripping force may be set by configuration. The gripping force may be pre-set, or may be dynamic. In some embodiments, (e.g., where the gripper 600 includes a camera), the gripper may use an image of the object to be gripped to determine a grip force. For example, the object may be used as input to a machine learning model or data store, and an output may correspond to a grip force for the object.

Optionally, the gripper 600 may further determine if a person is nearby (as sensed by the person-zone proximity sensor 608) prior to causing the gripper 602 to close or retain the object. This may help to avoid situations where an errant reading from the gripper zone object proximity sensor 606 causes the gripper 602 to close on or otherwise grip the object. In embodiments, the gripper 602 may open or release in response to detecting that no object is gripped by the gripper. Once the gripper 602 closes on an object, the gripper may hold the object in place in three-dimensional space until the simple gripper 600 detects a request to release the object.

The request to release the object may include, for example, a pattern of one or more tugs on the object (e.g., detected by the IMU 610), detecting an operator in using the person-zone proximity sensor, a timer, and/or any other indication that the object is to be released. Responsive to the request to release, the gripper 602 may open or otherwise release the object.

In embodiments, the simple gripper 600 may function without any machine learning component. In embodiments, the gripper 600 may not perform any motion to move between zones in a work area. Rather, gripper 600 may remain in the interaction zone, allowing a user to easily reach the gripper.

B. Complex Robotic Gripper

Figure 8:
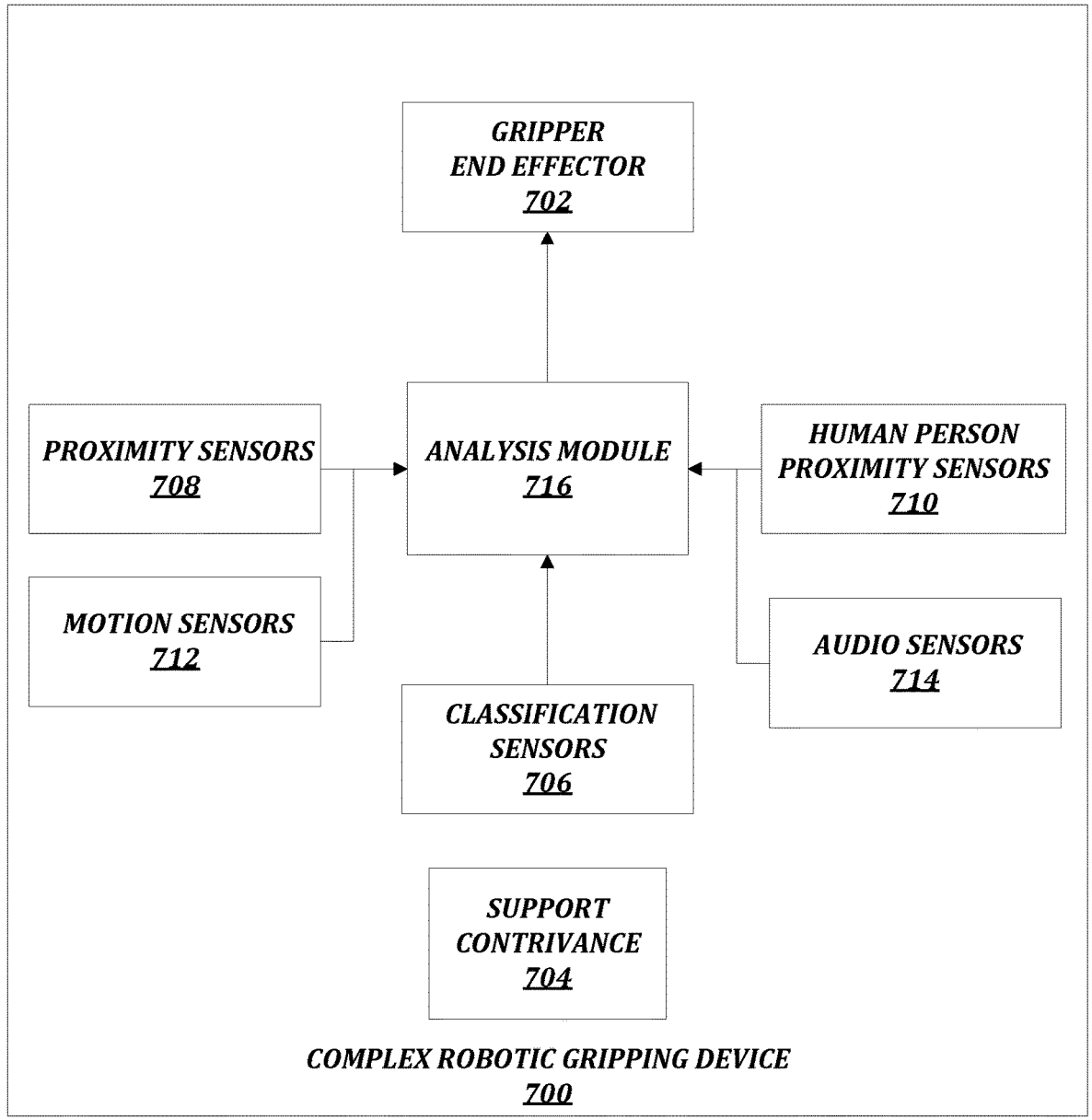
FIG. 8 is a block diagram of a second robotic gripping device consistent with the present disclosure.

FIG. 8 illustrates a complex robotic gripper 700. The complex robotic gripper 700 may include a robotic hand or other gripper 702 mounted on a support contrivance 704. The complex gripper 700 may sense a user's proximity and movement characteristics (e.g., location, speed and/or attitude of approach). In embodiments, the complex gripper 700 may enter into a coordinated movement with the user.

The support contrivance 704 of the robotic gripper may take any of a variety of forms. As non-limiting examples, the support contrivance 704 may include a multi-axis jointed arm-like support; a cartesian gantry-type support having a linear rail mounted on or under the work surface and a cantilevered support beam holding the gripper, and/or a hexapod or "delta"-like support structure, with differential extenders allowing positioning of the gripper in three-dimensional space. There are many different support contrivances 704 capable of supporting an end-effector (gripper) for use in the complex robotic gripper 700.

The complex robotic gripper 700 may include one or more sensors 706 to perform Machine Learning classification of an incoming object. For example, the one or more sensors 706 may include one or more cameras, one or more three-dimensional imaging sensors (e.g., using patterned infrared projection and parallax calculation), a set of one or more distance sensors aimed in particular locations to detect distinctly different object shapes, and/or any other sensors useful for detecting and classifying an object to be gripped. Once the object is classified, the gripper 700 may make one or more estimates regarding weight and physical conformation of the object.

The complex robotic gripper 700 may include additional sensors. For example, one or more proximity sensors 708 may be used to track motion (e.g., location, speed, attitude of approach, and rotation) of the object. In embodiments, the motion of the object may be programmatically analyzed to initiate acquisition of the object by the end-effector. In some embodiments, the motion of the object may be used as input for a Machine Learning process (local and/or remote) to improve detection of when an object is being offered for acquisition.

Responsive to confirmation of the object classification and determination of the object weight and other characteristics, the complex gripper device 700 may reconfigure the end-effector (e.g., a multi-fingered gripper 702) to accept the object, and prepare the support contrivance 704 to be able to support the appropriate weight. In embodiments, following receipt of the object, the complex gripper device 700 may move away from the interaction zone to avoid interference or obstruction.

The complex gripper device 700 may include one or more human person proximity sensors 710 for detecting proximity of a person (e.g., an operator), one or more motion sensors 712 for detection of motion, and/or one or more audio sensors 714 (e.g., one or more microphones) for detecting verbal commands from a user. Each of the sensors may be used as an input to a machine learning and/or programmatic analysis module 716, to determine when the human operator desires to retrieve the object. When such patterns are identified, the complex gripper device 700 may bring the gripper 702, with object, into the interaction zone and prepare to release the object. The complex gripper device 700 may detect the presence, orientation, and/or attitude of a human receiving hand prior to releasing the object into the hand. In embodiments, the determined object type may be used as a basis for selecting a method of releasing the object.

In some embodiments, the complex gripper device 700 may include one or more clutch locks 718 on the gripper 702 and/or the support contrivance 704. In some embodiments, one or more (e.g., each) of the clutch locks 718 may operate on the principles of active un-clutching. That is, the clutch locks 718 may be locked when unpowered, and require power to unlock (thus permitting movement). In this way, when the complex gripper device 700 is not moving, no power is being used to support the object (or the end-effector). This allows energy savings, as the motors are not continually stabilizing the weight of the object and/or the end-effector. Additionally, the clutch locks 718 may help to ensure that an item being gripped is retained in the event of a power failure. In other embodiments, one or more (e.g., each) of the clutch locks 718 may operate using the principles of active clutching. That is, the clutch locks 718 may be disengaged when unpowered (thus allowing for movement), and require power to lock (thus preventing movement).

In some embodiments, one or more (e.g., each) of the clutch locks 718 may include a mechanical spring release that allows two friction surfaces within the clutch lock to maintain a small gap therebetween. Alternatively, an electrostatic surface may be used to repel the friction surfaces away from each other, thereby maintaining the small gap between the two friction surfaces of the clutch lock 718 and allowing relative movement.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A robotic assistance device, comprising:
   a robotic arm configured assist a human being, the robotic arm including at least a first operative piece;
   one or more sensors configured to receive input data, the input data comprising information related to one or more activities being performed by the human being, a workspace in which the one or more activities are performed, a workpiece being affected by the one or more activities, and an object being held by the human being; and
   a processor operatively connected to the one or more sensors and the first robotic arm, the processor configured to:

process data received from the one or more sensors,
apply a machine learning model to the processed data to determine that a task should be performed by the robotic assistance device,
determine, based on the sensor data, a classification associated with an object held by the human being and configure the operative piece of the robot based on the classification; and
cause the operative piece to perform the task to reduce cognitive load on the human being.

2. The robotic assistance device of claim 1, wherein the operative piece comprises a gripper configured to grip the object, chosen from one of the following:
an impactive gripper,
an ingressive gripper,
an astrictive gripper, or
a contigutive gripper.

3. The robotic assistance device of claim 2, wherein the one or more sensors comprises an inertial monitoring unit; and
wherein determining that the task is complete comprises sensing a pattern of one or more tugs on the object using the inertial monitoring unit.

4. The robotic assistance device of claim 1, wherein the operative piece comprises a gripper, and wherein the task comprises delivering a tool gripped by the gripper to the human being.

5. The robotic assistance device of claim 1, wherein the operative piece comprises a gripper, and wherein the task comprises retrieving a tool from the human being.

6. The robotic assistance device of claim 1, wherein causing the operative piece to perform the task comprises the operative piece moving from a first position to a second position, and
wherein the processor is further configured to:
determine that the task is complete; and
responsive to determining that the task is complete, cause the operative piece to move from the second position to the first position.

7. The robotic assistance device of claim 1, wherein the one or more sensors comprises one or more of:
a person-zone proximity sensor; and
a gripper-zone object proximity sensor.

8. The robotic assistance device of claim 1, wherein the one or more sensors comprises one or more cameras.

9. The robotic assistance device of claim 1, wherein the robotic arm is mounted to a fixed location within a workspace.

10. The robotic assistance device of claim 1, wherein the arm is configured to be removably attached to the human being.

11. A method of operating a robotic assistance device comprising:
receiving input data, including:
information related to one or more activities being performed by a human being,
information related to a workspace in which the one or more activities are performed,
information related to a workpiece being affected by the one or more activities, and
information related to a classification associated with an object held by the human being;
processing the received input;
applying a machine learning model to the processed input to determine one or more assistance tasks based at least in part on the one or more activities being performed by the human being and the classification;
determining a response based, at least in part, on the processed input;
configuring an end effector of the robot based on the classification; and
causing the robotic assistance device to perform the one or more assistance tasks in response to the received input data to reduce cognitive load on the human being.

12. The method of claim 11, wherein the input data comprises one or more of the following:
sensor data from one or more sensors connected to the robotic assistance device,
communicated data from another device in signal communication with the robotic assistance device,
external data from one or more external sources, or
command data for augmenting one or more of the sensor data, the communicated data, or the external data.

13. The method of claim 12,
wherein the one or more sensors comprises an inertial monitoring unit; and
wherein determining that the task is complete comprises sensing a pattern of one or more tugs on the robotic assistance device using the inertial monitoring unit.

14. The method of claim 12, wherein the one or more sensors comprises one or more cameras.

15. The method of claim 11, wherein processing the received input comprises one or more of the following:
processing the input data using a local machine learning model,
processing the input data using a remote machine learning model, or
processing the input data using an algorithmic processing model.

16. The method of claim 11, further comprising:
determining that the task is complete; and
responsive to determining that the task is complete, causing the robotic assistance device to move from an operative position to a retracted position.

17. The method of claim 11, wherein the robotic assistance device comprises a gripper, and wherein the task comprises delivering a tool gripped by the gripper to the human being.

18. The method of claim 11, wherein the robotic assistance device comprises a gripper, and wherein the task comprises retrieving a tool from the human being.

19. The method of claim 11, wherein the robotic assistance device is mounted to a fixed location within a workspace.

20. The method of claim 11, wherein the robotic assistance device is configured to be removably attached to the human being.

* * * * *